(12) United States Patent
Ja

(10) Patent No.: US 12,541,085 B2
(45) Date of Patent: Feb. 3, 2026

(54) SYSTEM AND METHOD FOR MICROSCOPE OPTICAL ALIGNMENT

(71) Applicant: ARACELI BIOSCIENCES INC., Tigard, OR (US)

(72) Inventor: Shiou-jyh Ja, Portland, OR (US)

(73) Assignee: ARACELI BIOSCIENCES INC., Tigard, OR (US)

( * ) Notice: Subject to any disclaimer, the term of this patent is extended or adjusted under 35 U.S.C. 154(b) by 196 days.

(21) Appl. No.: 18/295,206

(22) Filed: Apr. 3, 2023

(65) Prior Publication Data

US 2024/0329381 A1    Oct. 3, 2024

(51) Int. Cl.

| | |
|---|---|
| G02B 7/36 | (2021.01) |
| G02B 21/16 | (2006.01) |
| G02B 21/18 | (2006.01) |
| G02B 21/24 | (2006.01) |
| G02B 21/36 | (2006.01) |
| G06T 7/00 | (2017.01) |
| G06T 7/80 | (2017.01) |
| H04N 17/00 | (2006.01) |

(52) U.S. Cl.
CPC .......... *G02B 21/362* (2013.01); *G02B 21/16* (2013.01); *G02B 21/18* (2013.01); *G02B 21/244* (2013.01); *G02B 21/367* (2013.01); *G06T 7/0002* (2013.01); *G06T 7/80* (2017.01); *H04N 17/002* (2013.01); *G06T 2207/10056* (2013.01); *G06T 2207/10148* (2013.01); *G06T 2207/30168* (2013.01)

(58) Field of Classification Search
CPC ...... G02B 21/362; G02B 21/16; G02B 21/18; G02B 21/244; G02B 21/367; G06T 7/80; G06T 7/0002; G06T 2207/10056; G06T 2207/10148; G06T 2207/30168; H04N 17/002

See application file for complete search history.

(56) References Cited

U.S. PATENT DOCUMENTS

| | | | |
|---|---|---|---|
| 7,700,903 B2 | 4/2010 | Weiss et al. | |
| 2004/0145671 A1* | 7/2004 | Wang | G02B 7/36 348/349 |
| 2006/0181700 A1* | 8/2006 | Andrews | G01N 21/4738 356/237.2 |

(Continued)

OTHER PUBLICATIONS

Brenner, J. et al., "An Automated Microscope for Cytologic Research a Preliminary Evaluation," Journal of Histochemistry & Cytochemistry, vol. 24, No. 1, Jan. 1976, 12 pages.

(Continued)

*Primary Examiner* — Patrick E Demosky
(74) *Attorney, Agent, or Firm* — McCoy Russell LLP

(57) ABSTRACT

Methods and systems are provided for a microscope system. In one example, a method for image-based detection of optical alignment for the microscope system comprises acquiring a plurality of contrast samples of a field of view of a subject, determining a contrast distribution for a plurality of divided sub-regions for the field of view based on the plurality of contrast samples, and generating an amount of angular discrepancy based on an in-focus position derived from the contrast distribution for each of the plurality of divided sub-regions. In one example, the method further comprises adjusting the microscope system based on the amount of angular discrepancy.

19 Claims, 8 Drawing Sheets

(56) References Cited

U.S. PATENT DOCUMENTS

| | | | |
|---|---|---|---|
| 2011/0157349 A1* | 6/2011 | Yamamoto | G02B 21/006 |
| | | | 348/373 |
| 2016/0109700 A1* | 4/2016 | Huang | G01M 11/02 |
| | | | 359/239 |
| 2018/0003923 A1* | 1/2018 | Fukuda | G02B 7/36 |
| 2022/0108430 A1* | 4/2022 | Shi | G06T 5/73 |
| 2023/0055333 A1 | 2/2023 | Policelli et al. | |
| 2023/0056456 A1 | 2/2023 | Policelli et al. | |
| 2023/0057023 A1 | 2/2023 | Policelli et al. | |
| 2023/0057099 A1 | 2/2023 | Anderson | |
| 2023/0058085 A1 | 2/2023 | Policelli et al. | |

OTHER PUBLICATIONS

Yazdanfar, S. et al., "Simple and Robust Image-Based Autofocusing for Digital Microscopy," Optics Express, vol. 16, No. 12, Jun. 9, 2008, 8 pages.

Ja, S., "System and Method for Microscope High-Speed Auto-Focusing," U.S. Appl. No. 17/808,491, filed Jun. 23, 2022, 73 pages.

* cited by examiner

SYSTEM AND METHOD FOR MICROSCOPE OPTICAL ALIGNMENT

FIELD

The present description relates generally to methods and systems for microscopic imaging, and in particular, to optical alignment in microscopy.

BACKGROUND/SUMMARY

Digital microscopy often demands acquisition of high-resolution details of a subject, along with a wide-area or high-throughput imaging capability, for whole-slide imaging and high-content analysis. Microscope systems configured for high-speed imaging often include features for auto-focusing of the subject. Auto-focusing may be based on indirect or direct measurement of imaging parameters. Indirect methods for auto-focusing measure physical quantities other than the image quality and often utilize particular hardware configurations and components such as relying on a high-precision motorized mechanical stage with a position encoder, or decoding the optical signal via an optical triangulation routine, imaging laser beam convergence, multi-angle correspondence, or low-coherence interferometry. Direct methods for auto-focusing often include measurement of image contrast and/or image high-frequency components derived from the acquired image content.

The inventors herein have recognized potential issues with such approaches. As one example, in existing microscope systems, direct and indirect methods for auto-focusing commonly derive a single figure of merit from either the entire subject or a portion of the field of view. Often, the best focusing position, where contrast is sharp and the subject is most in focus, may either be a compromised focusing position, or may produce a focused image at the center of the image only. For example, such approaches may not locate a high-quality focus throughout the entire field of view due to possible tilting between the sample plane and the focal plane. In some examples, tilting between the sample plane and the focal plane may cause focal distance discrepancy as small as a few microns; however, degradation of the image quality, usually at edges or corners of the field of view, can be significant. The degradation is especially significant with an objective lens of large numerical aperture, which has the depth of the field less than one micron. Such image quality degradation may be addressed during the manufacturing process, but downstream processes may introduce disturbance of the optical alignment. For example, shipping and handling, improper sample loading, and accessory selection, such as the substrate of the sample holder, regularly pose challenges for maintaining image quality. An effective methodology to evaluate and furthermore to mitigate such image degradation may be desirable for achieving high-performance microscopy.

In one example, the issues described above may be addressed by a method for image-based detection of optical alignment for a microscope system, comprising: acquiring a plurality of contrast samples of a field of view of a subject; determining a contrast distribution for a plurality of divided sub-regions for the field of view based on the plurality of contrast samples; and, generating an amount of angular discrepancy based on an in-focus position derived from the contrast distribution for each of the plurality of divided sub-regions. In this way, imaging quality across the entire field of view of the subject may be increased and imaging throughput may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
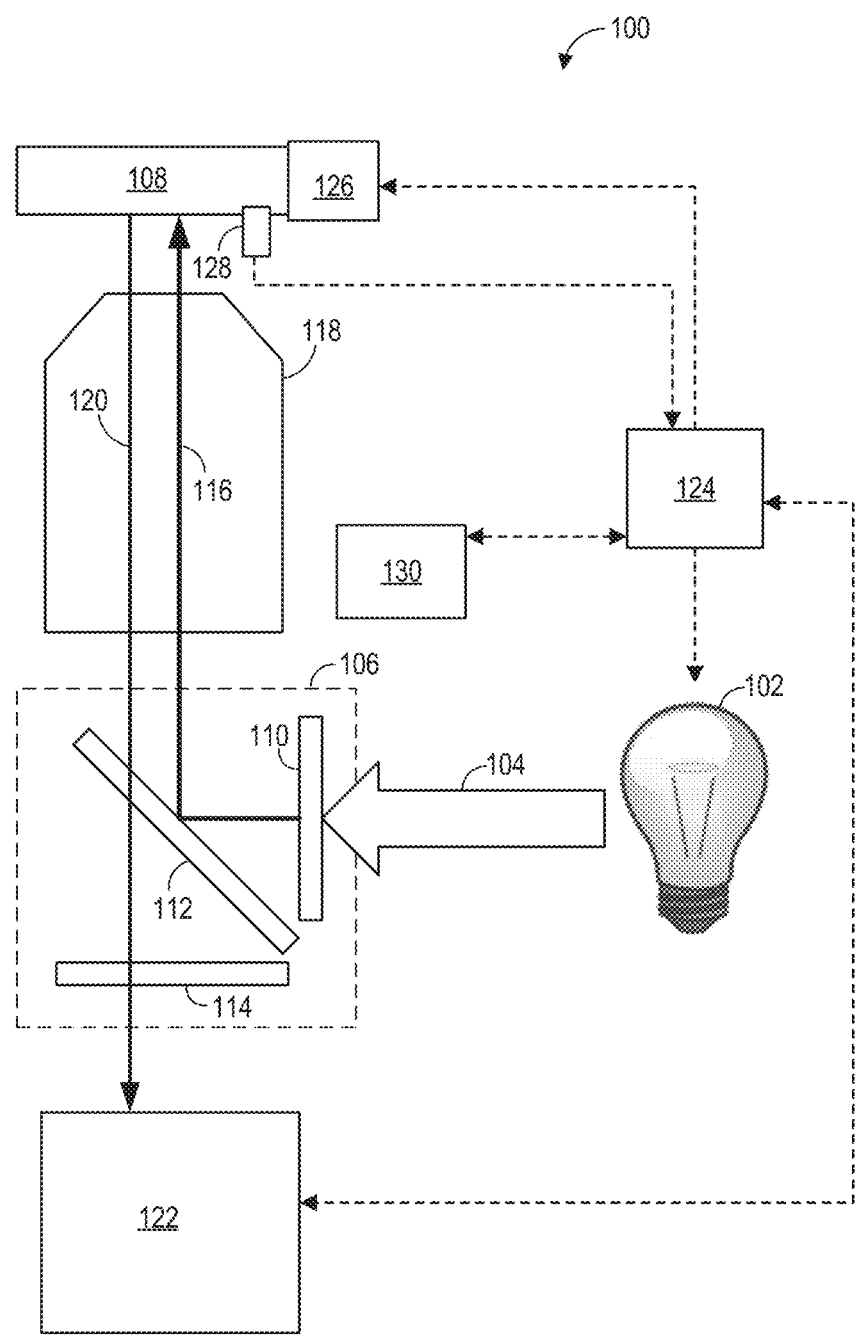
FIG. 1 shows a schematic diagram of a quantitative microscopy assembly.
Figure 2:
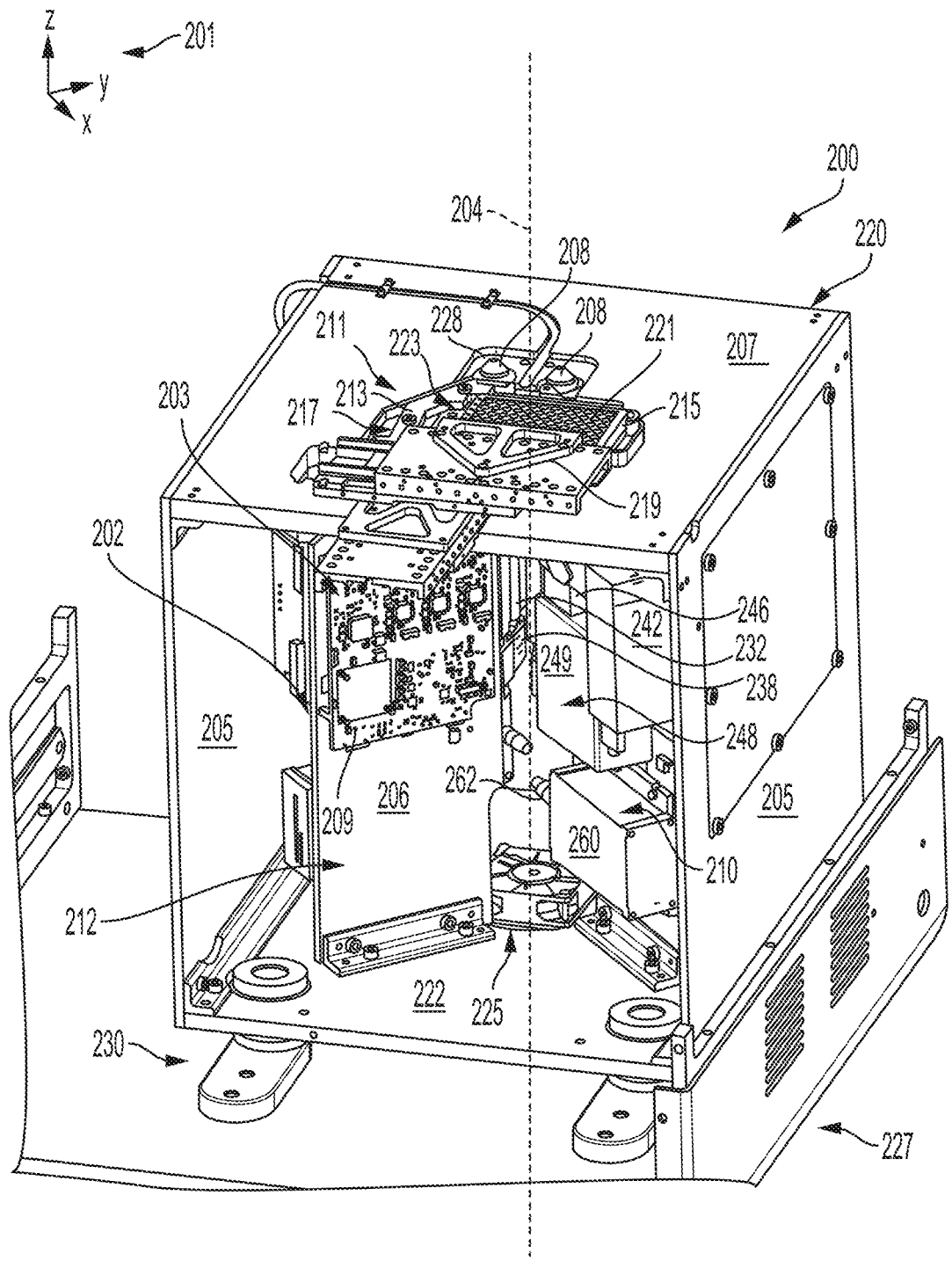
FIG. 2 shows a perspective view of a multi-detector quantitative microscopy system.
Figure 4:
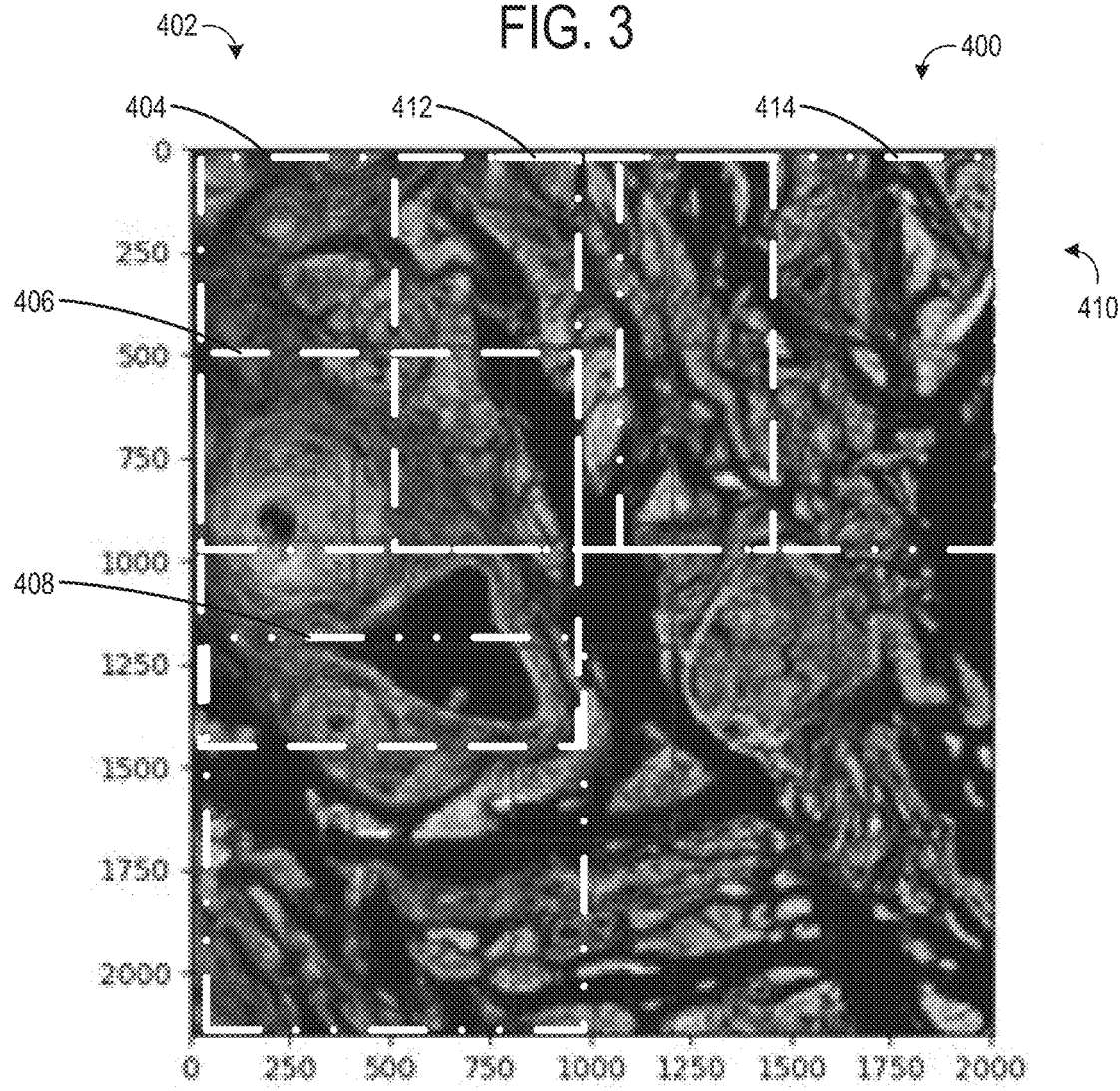
FIG. 4 shows an example of a subject divided into sub-regions.
Figure 5:
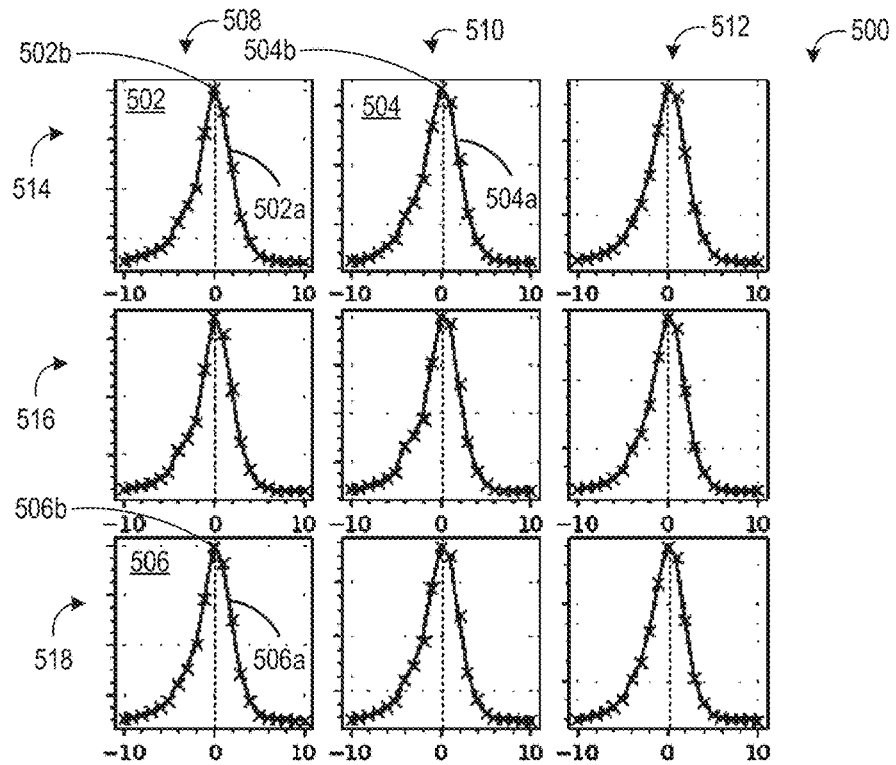
FIG. 5 shows a first example of a set of contrast of distribution curves for a plurality of divided sub-regions representing a field of view of a first subject.
Figure 6:
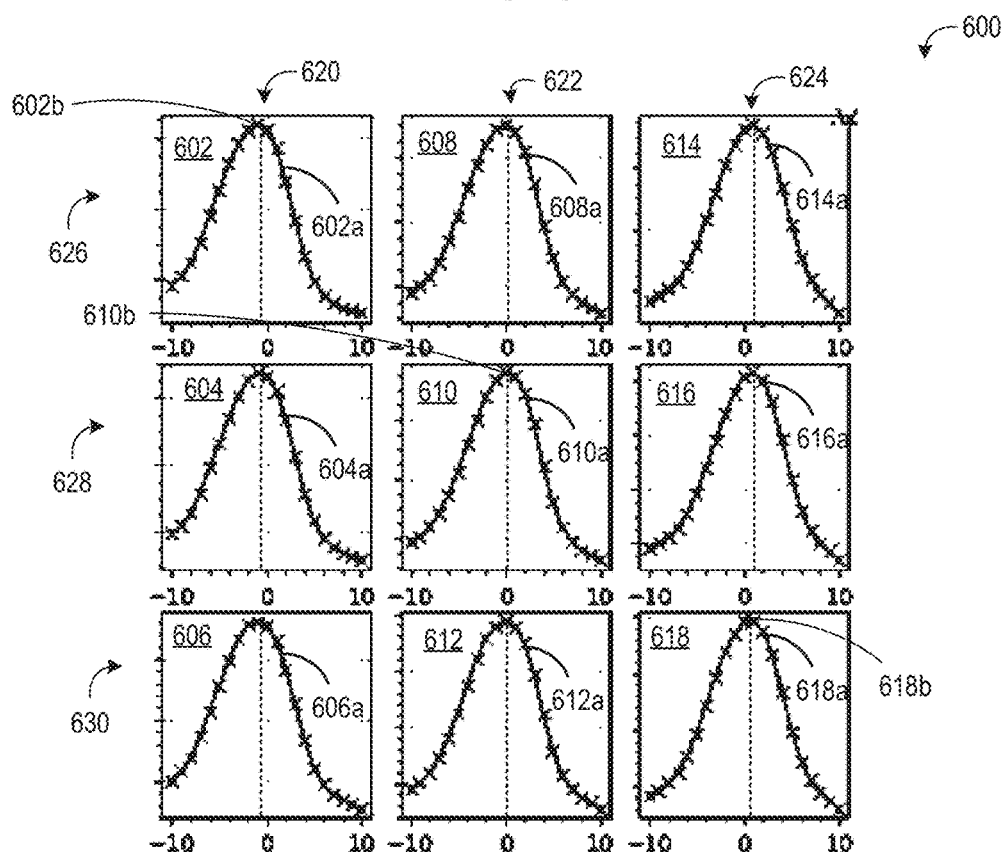
FIG. 6 shows a second example of a set of contrast distribution curves for a plurality of divided sub-regions representing a field of view of a second subject.

The following description relates to systems and methods for detecting angular discrepancy between a sample plane and a focal plane in a high throughput microscope system. Possible correcting systems are also provided for increasing the focusing quality and the image quality across an entire field of view. An exemplary microscope imaging system is described with respect to FIG. 1 and FIG. 2. The microscope imaging system may be a multi-detector quantitative microscope system. An example of an assembly for quantitative microscopy is depicted in FIG. 1 as a schematic diagram. The assembly shown in FIG. 1 may be included in each of four blades of a multi-detector quantitative microscopy system, as shown in FIG. 2. A subject for imaging may be arranged at a stage of the system, and a distance between the subject and an objective lens of the system may be adjusted to control the focusing of the subject; however, angular discrepancy between the sample plane and the focal plane may degrade image quality. The disclosure describes a method for detecting angular discrepancy using an image-based technique, including measuring contrast or Brenner gradient in sample images of a field of view. An exemplary contrast distribution along various focal distances is described with respect to FIG. 3. By dividing the entire field of view into several sub-regions, the contrast distribution in each sub-region along a Z-axis, including an in-focus position, can be derived. FIG. 4 shows a field of view of an exemplary subject divided into sub-regions. FIGS. 5-6 each show examples of a set of contrast distributions obtained for a field of view divided into sub-regions. Angular discrepancy can be visualized in a 2D array representing the in-focus position derived at each sub-region of the field of view, such as described with respect to FIG. 7. Angular discrepancy may be mitigated by mechanical adjustment of the optical alignment of the multi-detector quantitative microscope system based on the derived in-focus positions, such as described with respect to FIG. 8 and FIG. 9. A flow chart illustrating a method 1000 for detecting angular discrepancy based on a contrast distribution of sampled images is described with respect to FIG. 10. A flow chart illustrating a method 1100 for mitigating angular discrepancy is described with respect to FIG. 11.

Turning now to FIG. 1, a schematic diagram for a quantitative microscopy assembly 100 (hereafter, the assembly 100) is shown. In one example, the assembly 100 may be configured as a fluorescence microscopy assembly. However, various other types of analytical microscopic imaging techniques are possible, including, but not limited to, transmitted-mode microscopy, wide-field microscopy, confocal microscopy, lightsheet microscopy, luminescence, colorimetry, etc. The assembly 100 of FIG. 1 includes a light source 102 providing incident light to components arranged in a path of the incident light, as indicated by arrow 104. The light source 102 may be a mercury-vapor lamp, a xenon arc lamp, a laser, or one or more light-emitting diodes (LEDs). In one example, the assembly 100 may be included in a multi-detector microscope system, such described below with respect to FIG. 2.

The incident light may be directed to a filter cube 106 (e.g., also called a filter block). The filter cube 106 may house components that filter the incident light such that target wavelengths are transmitted to a target to be analyzed, e.g., one or more samples supported on a sample holder 108. In one example, the sample holder 108 may be a microplate. In the example of FIG. 1, three filtering components are arranged in the filter cube 106, including an excitation filter 110, a dichroic filter 112, and an emission filter 114. The incident light may first pass through the excitation filter 110 which filters the light to allow select, e.g., target, wavelengths to continue past the excitation filter 110 and block other wavelengths of light. The target wavelengths may be wavelengths that excite electrons in specific fluorophores or fluorochromes, resulting in release of photons when the excited electrons relax to a ground state.

The excitation light, e.g., light that has been filtered by the excitation filter 110, then strikes the dichroic filter 112 (or dichroic beamsplitter), as indicated by arrow 116. The dichroic filter 112 may be a mirror, for example, arranged at a 45 degree angle relative to an optical path of the assembly 100, e.g., angled at 45 degrees relative to the path of incident light indicated by arrow 104. A surface of the dichroic filter 112 may include a coating that reflects the excitation light, e.g., light filtered by the excitation filter 110, but allows fluorescence emitted from the sample at the sample holder 108 to pass therethrough. The reflected excitation light, as indicated by arrow 116, passes through an objective lens 118 to illuminate the sample holder 108. If the sample positioned in the sample holder 108 fluoresces, light is emitted, e.g., generating emission light as indicated by arrow 120, and collected by the objective lens 118. The emission light passes through the dichroic filter 112 and continues to the emission filter 114, which blocks undesired excitation wavelengths from passing therethrough. The filtered emission light is received at a detector 122. The detector 122 may be a camera, such as a charge-coupled device (CCD) camera, in one example. In other examples, the detector 122 may be another type of camera, for example, a CMOS camera, or a photomultiplier tube.

At the detector 122, the emission light may be converted into electronic data. For example, when the detector 122 is the CMOS camera, the detector 122 may include a light sensor configured as a transistor on an integrated circuit. Photons of the emission light may be incident on the light sensor and generate an electrical charge that is converted into electronic data representative of a photon pattern of the emission light captured within a field of view (FOV) of the camera. The electronic data may be stored at a memory of the camera, such as random access memory, and may be retrieved by a controller 124.

The controller 124 may be a computer, including various components such as a processor, input/output ports, an electronic storage medium for executable programs and calibration values, random access memory, a data bus, etc. The electronic storage medium can be programmed with computer readable data representing instructions executable by the processor for performing the methods described below as well as other variants that are anticipated but not specifically listed. The controller 124 may be coupled to various accessory devices including input devices such as a keyboard, a mouse, etc.

The controller 124 may be communicatively coupled to components of the assembly 100. For example, the controller 124 may be configured to command activation/deactivation of the light source 102 when prompted based on user input. As another example, the controller 124 may instruct adjustment of a position of the sample holder 108 to focus the excitation light on a different region of the sample holder. The controller 124 may command actuation of a motor 126 coupled to the sample holder 108 to vary the position of the sample holder 108 with respect to the objective lens 118 and the excitation light and provide instructions on how the sample holder position is to be modified. In some examples, a position sensor 128 may monitor the actual position of the sample holder 108 and may be communicatively coupled to the controller 124 to relay the sample holder position to the controller 124.

The controller 124 may also be communicatively coupled to the detector 122. As such, electronic data collected by the detector 122 may be retrieved by the controller 124 for further processing and display at an interface, such as a computer monitor. It will be appreciated that the controller 124 may be further coupled to other sensors and actuators of the assembly 100. In one example, communication between the controller 124 and the sensors and actuators of the assembly 100 may be enabled by various electronic cables, e.g., hardwiring. In other examples, the controller 124 may communicate with the sensors and actuators via a wireless protocol, such as Wi-Fi, Bluetooth, Long Term Evolution (LTE), etc.

According to the routines and configurations described herein, the quantitative microscopy assembly 100 is provided with image-based angular discrepancy detection for increasing focus throughout an entire FOV. The controller 124 performs image-based detection of angular discrepancy by acquiring a plurality of contrast samples of a FOV of a subject. The contrast samples are acquired by the detector 122 at various focal distance across an in-focus position of the subject (e.g., positioned in the sample holder 108) relative to the objective lens 118. The controller 124 determines a contrast distribution for a plurality of divided sub-regions of the FOV based on the plurality of contrast samples. An amount of angular discrepancy is generated by the controller 124 based on the in-focus position derived from the contrast distribution for each of the plurality of divided sub-regions. In one example, an adjustment may be made to the optical alignment of the quantitative microscopy assembly 100 in response to detection of angular discrepancy exceeding a threshold angular discrepancy. The adjustment may minimize image quality variation across the entire FOV. Image-based tilt detection and correction methods and systems are discussed in detail below.

The assembly 100 may further include an auto-focus system 130, communicatively coupled to the controller 124. The auto-focus system 130 may utilize a sensor configured with a light source and optical elements for modifying and directing a light beam from the light source to the sample holder 108. An image may be generated based on reflection of the light beam, which may be used by the controller 124 to determine a suitable adjustment of the objective lens and/or the sample holder 108 to align the focus of the objective lens with a target interface at the sample holder 108. In one example, the auto-focus system 130 may rely on a laser beam, and auto-focus algorithms implemented at the controller 124 to rapidly focus the assembly 100 on a desired area of the sample. In one example, the auto-focus system 130 may coordinate with the controller 124 to provide an initial in-focus position for a FOV of a subject during image-based tilt detection. For example, the auto-focus system 130 may find the focal distance producing the clearest image across which to acquire the plurality of contrast samples.

It will be appreciated that the assembly 100 depicted in FIG. 1 is a non-limiting example of a quantitative microscopy assembly. Other examples may include variations in quantities of individual components, such as a number of dichroic, excitation, and emission filters, a configuration of the light source, relative positioning of the components, etc. In one example, the quantitative microscopy assembly, e.g., the assembly 100 of FIG. 1, may be used for high throughput screening of biological samples.

In one example, as shown in FIG. 2, a multi-detector system 200 may be formed of four individual blades 202 arranged in an x-configuration. Each blade 202 of the multi-detector system 200 may include at least the components depicted in the assembly 100 of FIG. 1 and the blades 202 may be operated concurrently to collect image data in parallel. Each blade 202 therefore forms an individual quantitative microscopy assembly. The components arranged in each of the blades 202 may be positioned to optimize both a FOV of an objective lens of each blade and a magnification/resolution of the resulting images. As such, the components may be arranged in a vertical orientation, e.g., as a stack along each blade. A set of reference axes 201 is provided, indicating a y-axis, an x-axis, and a z-axis. In one example, the z-axis may be parallel with a direction of gravity. Furthermore, a central axis 204 of the multi-detector system 200 may be parallel with the z-axis.

In the view shown in FIG. 2, a side wall 205 of the housing 220 of the multi-detector system 200 is omitted to show two of the blades 202 and two of the blades 202 are enclosed by the housing 220. The housing 220 includes a top plate 207 coupled to top edges of two pairs of opposite oriented side walls 205. The top plate 207 may be a rigid plate with a square geometry and may have similar dimensions to a base 222. The top plate 207, the base, and the side walls 205 form an approximately rectangular prism for enclosing components of the multi-detector system 200.

In one example, each blade 202 of the multi-detector system 200 may be similarly configured, including a vertically oriented plate 206 supporting a variety of components, such as, but not limited to, the components described with the quantitative microscopy assembly shown in FIG. 1. Each blade 202 may have a front side 210 and a back side 212. An objective lens 208, which may be an embodiment of the objective lens 118 of FIG. 1, may be positioned at a top of each blade 202 with other components of each blade 202 arranged below the objective lens 208, with respect to the z-axis. In one example, the objective lenses of the blades 202 are clustered around the central axis 204. The objective lens 208 may be attached to the plate 206 by an objective module 228. The objective module 228 may include an objective lens mover which may be a motor that adjusts the position of the objective lens 208 along the z-axis, as well as a position sensor (not shown) to monitor the position of the objective lens along the z-axis. The objective mover may be controlled, e.g., activated/deactivated, by a controller such as controller 124 of FIG. 1.

In one example, the front side 210 of the plate 206 may include a first optical passage 232 that extends vertically (e.g., along the z-axis) directly below the objective lens 208. The first optical passage 232 may enclose microscope components, e.g., a tube lens, emission filter, selective mirrors, etc., and may be an embodiment of the filter cube 106 of FIG. 1. A camera 238, which may be an embodiment of the detector 122 of FIG. 1, may be coupled to the plate 206 directly below the first optical passage 232. A second optical passage 246 may be coupled to the plate 206 adjacent to the first optical passage 232. In one example, the first optical passage 232 and the second optical passage 246 are optically coupled. The blade 202 may also include a light source 248, which may be an embodiment of the light source 102 of FIG. 1, enclosed by a cover 249 that is secured to the front side 210 of the plate 206.

In one example, the front side 210 of the plate 206 of the blade 202 may support a laser auto-focus sensor (LAF sensor) 242. In one example, the LAF sensor 242 may emit a laser beam into an optical path of the quantitative microscopy assembly, such that the LAF sensor 242 may use the laser beam as an optical probe to determine a focus of the quantitative microscopy assembly. In one example, the LAF sensor 242 may be configured to produce a 785 nm red laser beam from a light source such as a laser diode. The laser beam may be reflected from a surface of the sample or a surface of a sample holder (e.g., a microplate) and return to the LAF sensor 242 as an optical signal which may be used to assess a focus of the quantitative microscopy assembly.

A laser auto-focus controller (LAF controller) 260 may be arranged below, e.g., with respect to the z-axis, the light source 248 and the LAF sensor 242. The LAF controller 260 may include various electronic components for signal processing, operation of the LAF sensor, monitoring a status of the LAF sensor, etc., and adapted with a connector 262 to allow coupling of a cable to the LAF sensor 242. The cable may enable communication between the LAF sensor and the LAF controller 260. The LAF controller 260 may include a plurality of ports along to allow the LAF controller 260 to be connected to, for example, a system controller, such as the controller 124 of FIG. 1.

Connectivity between the LAF controller 260 and the system controller may allow a position of the objective lens 208 to be adjusted based on an alignment of the quantitative microscopy assembly focus with a target focal plane as detected by the LAF sensor 242. For example, the LAF controller 260 may include computer readable instructions for executing an auto-focusing routine for adjusting a position of the objective lens 208 relative to a subject positioned in a well 221 of the microplate 215. In one example, the auto-focusing routine may include identifying a target focal plane of a FOV of each objective lens of the multi-detector system, adjusting a vertical position of each objective lens relative to the target focal plane based on a light shape generated from the laser beam, and aligning a focus of each objective lens according to a power level detected by the LAF sensor. For example, when the focus is determined to be out of alignment with the target focal plane, the LAF controller 260 may inform the system controller of an amount of offset of the focus from the target focal plane. In response to the information from the LAF controller 260, the system controller may command adjustment of the objective lens 208 by activating the objective mover of the objective module 228 and modifying the position of the objective lens 208 along the z-axis accordingly. The LAF controller 260 and LAF sensor 242 may be referred to as a LAF system. In one example, the LAF system may be an embodiment of the auto-focus system 130 of FIG. 1.

The light source 248 may be powered and controlled by a printed circuit board assembly (PCBA). An example of a PCBA 203 is depicted coupled to the back side 212 of the blade 202. The PCBA 203 may include various electronic components coupled to a printed circuit board (PCB) 209. For example, the LEDs of the light source 248 may be directly coupled to the PCB 209 via soldering. The various electronic components may further include diodes, capacitors, resistors, switches, inductors, etc.

The multi-detector system 200 may include a sample receiving assembly 211 positioned above and attached to the top plate 207. In one example, the sample receiving assembly 211 may include a plate holder 213 coupled to a stage 217. The plate holder 213 may include a portion that extends onto and over the stage 217, forming a bracket 219. The bracket 219 may be secured to the stage 217 via fasteners, thereby fixedly coupling the stage 217 to the plate holder 213. The stage 217 is arranged alongside the plate holder 213 (with the exception of the bracket 219 of the plate holder 213) such that the stage 217 is located beside a microplate 215 when the microplate 215 is positioned in an opening 223 of the plate holder 213. The stage 217, configured to adjust the position of the plate holder 213 along the top plate 207, is coupled to the plate holder 213.

In one example, the objective lenses 208 may extend upwards from the blades 202 into a space between the top plate 207 and the plate holder 213 but do not contact the plate holder 213 or the microplate 215 supported by the plate holder. The plate holder 213 may be translated along the x-y plane without obstacles impeding movement of the plate holder 213. A distance that the plate holder 213 is vertically spaced away from the objective lens 208 may be configured to allow the objective lenses 208 to be positioned at a target distance from the microplate 215, located above, and a target distance from tube lenses, located below. By placing the objective lenses 208 at the target distances from the microplate 215 and the tube lenses, a maximum FOV and resolution may be obtained from the quantitative microscopy assemblies of the multi-detector system 200.

The stage 217 may be a two-axis stage configured with bearings, such as mechanical bearings, air bearings, etc., to allow the plate holder 213 to translate along each of the x-axis and the y-axis relative to the objective lenses 208. In some examples, movement of the stage, and therefore of the plate holder 213, may be controlled by a motor. In other examples, a relative position of the stage 217 may be manually adjusted. Adjustment of the positioning of the stage 217 allows the FOVs of the objective lens 208 to be modified with respect to the microplate 215, allowing complete imaging of the microplate 215.

Each blade 202 clustering around the central axis 204 forms an area of space in which a central fan 225 may be located. The multi-detector system 200 is shown resting on a chassis 227. The chassis 227 may support peripheral components such as electronic devices coupled to the multi-detector system 200. The multi-detector system 200 may also include vibration isolators 230 coupled to the base 222 of the housing 220. The vibration isolators 230 may be supports upon which the housing 220 of the multi-detector system 200 sits.

The multi-detector system 200 is provided with image-based angular discrepancy detection for increasing focus across an entire FOV. As commonly applied, auto-focusing strategies may derive a single figure of merit from either the entire subject or only from the center of the FOV. To increase focus across the entire FOV, the system controller (e.g., controller 124 in FIG. 1) includes computer readable instructions that when executed cause the controller to perform a series of actions to detect a degree of tilt between a focal plane of the objective lens 208 and a sample plane of a subject positioned in a well 221 of the microplate 215. The actions include acquiring a plurality of contrast samples of the subject; determining a contrast distribution for a plurality of divided sub-regions for a field of view based on the contrast samples; and, generating an amount of angular discrepancy based on an in-focus position derived from the contrast distribution for each of the plurality of divided sub-regions.

In one example, the plurality of contrast samples may be acquired by the camera 238 coupled to the objective lens 208. The plurality of contrast samples may be acquired at various focal distance across the in-focus position for a central part of the FOV of the subject. In one example, the in-focus position for the central part of the FOV may be determined using the LAF system, including the LAF sensor 242, the LAF controller 260, and the auto-focusing algorithms for adjusting the position of the objective lens 208 relative to the subject based on the reflection of the light beam programmed thereon. In other examples, an auto-focus system may use an alternate method for determining the in-focus position. The controller may include further instructions for mitigating detected angular discrepancy (e.g., tilting error) using various strategies that may be selected based on, for example, operating conditions, and/or user preferences. Additionally or alternatively, in response to detecting angular discrepancy on the tilting information, a user may manually adjust the microscope assembly similarly. In one example, angular discrepancy detection may be performed for each detector coupled to each objective lens of the plurality of objective lenses in a multi-detector system. For example, angular discrepancy detection may be performed for the microscope assembly including camera 238 coupled to objective lens 208 on each of the four individual blades 202 of the multi-detector system 200. In one example, angular discrepancy detection may be performed following installation of a multi-detector system or other microscope system. In other examples, angular discrepancy detection may be performed after changing a sample plate. Image-based detection of angular discrepancy and tilt mitigation strategies increase focus across the imaged sample, enabling faster, and more rigorous high-throughput image analysis.

Figure 3:
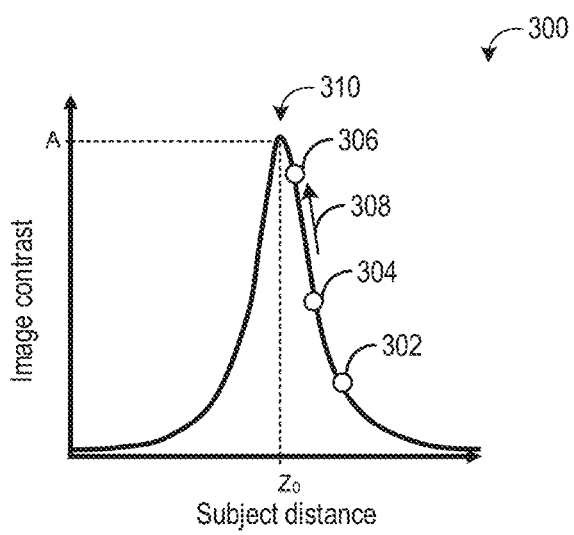
FIG. 3 shows an example contrast distribution curve across an in-focus Z coordinate acquired by a controller of a quantitative microscope assembly.

Referring to FIG. 3, a plot 300 is shown illustrating a Brenner gradient distribution curve across an in-focus $Z=Z_0$ coordinate including contrast samples acquired by a controller of a microscope assembly (e.g., similar to, or the same as, the controller 124 of quantitative microscopy assembly 100 described above). The Brenner gradient distribution, may be considered as the image contrast distribution or contrast distribution, is used to find the focal distance (or position) of greatest contrast based on measuring of contrast in sample images. The Brenner gradient distribution is a reliable image-based focusing technique with little computation expense. However, the technique as commonly applied often derives a single figure of merit (such as the image contrast or the Brenner gradient value) from either the entire region or only the center region of the image. Therefore, the best focus position, where contrast is sharp and the imaged subject is distinct, may either be only a compromised focusing position, or may only produce focused image at the center of the image. The disclosed strategy uses the Brenner gradient distribution to detect the focal distance of greatest contrast at each of a plurality of divided sub-regions of a subject FOV. Contrast samples may be acquired by the controller by adjusting a focal distance between a subject and an objective lens of the microscope assembly (e.g., between a subject in the sample holder 108 and the objective lens 118 in FIG. 1 or between a subject in the microplate 215 and objective lens 208 in FIG. 2). For example, a distance along the z-axis between the objective lens and the subject may be modulated by adjusting the vertical position of the objective lens, e.g., by an automated or manual mechanism as described above (e.g., via commands to the objective module 228 in FIG. 2). In the plot, the x-axis represents subject distance Z, where the subject distance is a distance between the subject and the objective lens, and the y-axis represents image contrast with focus increasing upward.

The Brenner gradient may be calculated using pixel intensities of acquired images and the equation $$B_{zy} = \frac{\sum_{x,y}(I(x, y+2) - I(x, y))^2}{\sum_{x,y} I(x, y)^2}, B_{zx} = \frac{\sum_{x,y}(I(x+2, y) - I(x, y))^2}{\sum_{x,y} I(x, y)^2},$$

$$B_z = \sqrt{B_{zy}^2 + B_{zx}^2},$$

where I is the image intensity at pixel (x, y) acquired at a subject distance of Z (where the subject distance is a distance between the subject and the objective lens). The calculation may detect image contrast along both the x-axis and the y-axis direction of the FOV.

The value of $B_z$ at various subject distances, Z, around the in-focus position, where $Z=Z_0$, will have a distribution that can be described by the Lorentzian function:

$$L(z) = \frac{A}{1 + \left(\frac{z-z_0}{H}\right)^2},$$

where A is the peak amplitude and H is the half-width at half-maximum (HWHM). The in-focus position, where $Z=Z_0$, is shown at peak 310.

If the subject is not at the actual peak focused position, where $Z=Z_0$, the calculated Brenner gradient will be located on the corresponding Lorentzian curve sitting at an off-peak position. For example, first marker 302, second marker 304, and third marker 306 each sit at an off-peak position. A goal of the auto-focusing process is to move the subject toward the peak focused position, where the peak focused position is represented by the peak 310 of the Lorentzian curve.

One way to reach the in-focus direction is to change the subject distance Z at a fixed interval toward the favorable direction, where the Brenner gradient is increasing as shown by arrow 308. While a larger number of data points with smaller step size across the Brenner gradient distribution curve may increase the accuracy of the in-focus position, it is time consuming and prohibitive due to the movement resolution across the mechanical stage. Since the distribution of the Brenner gradient at various subject distances is a Lorentzian function, it is reasonable to use a curve fitting routine based on a few data points to estimate the peak and hence the in-focus position. In some examples, although the Lorentzian curve fitting routine may be used with as few as three contrast samples to determine the peak focused position during conditions in which the signal-to-noise ratio of the contrast samples is very high, the initial position of the subject is close to the actual peak focused position, and an estimated half-width half-maximum of the Lorentzian curve is approximately equal to the actual value. However, during conditions in which the initial position of the subject is not close to the actual peak focused position, the Brenner gradient becomes smaller and its signal-to-noise (SNR) ratio decreases rapidly. Some curve fitting routines such as those based on the Levenberg-Marquardt (LM) algorithm utilize initial guesses to model an initial curve, such as guesses as to the amplitude, peak location, and the half-width half-maximum of the curve. The additional computation in modeling effort may take much less time than the image acquisition process due to the slow mechanical movement.

FIG. 4 shows an example of a subject 400 divided into sub-regions. The subject 400 includes a 2000 by 2000 pixel FOV. In one example, the subject 400 may be divided into a plurality of sub-regions for estimating angular discrepancy based on contrast distribution, such as described with respect to FIG. 3. In one example, the subject 400 may be divided into 3 columns and 3 rows for nine sub-regions. In the example, a first column 402 and a first row 410 are shown representing five sub-regions of the exemplary nine sub-regions. In one example, at least some portion of each sub-region overlaps with one or more adjacent sub-regions. In another example, each sub-region may not overlap with an adjacent sub-region. In some examples, each pixel representing of the FOV, e.g., the entire field of view, is represented in at least one sub-region.

In the example shown for subject 400, the first column 402 of sub-regions is highlighted including a first sub-region 404 indicated by dash-dot broken lines, a second sub-region 406 indicated by broken lines, and a third sub-region 408 indicated by dot-dot-dash broken lines. The first row 410 of sub-regions is highlighted including the first sub-region 404, a fourth sub-region 412 indicated by broken lines, and a fifth sub-region 412 indicated by dot-dot-dash broken lines. In the example, the first sub-region 404, the second sub-region 406, the third-sub region 408, the fourth sub-region 412, and the fifth sub-region 414 are 1000 by 1000 pixel area regions of the subject 400.

In one example, the number of sub-regions that a field of view is divided into may depend on factors including balancing the signal and noise ratio and the statistical significance. For example, too small of sub-regions (e.g., too few pixels) or too many sub-regions may increase the noise of the Brenner value calculation. Noisy signals may increase difficulty of identifying the peak of the Brenner value or focal position of greatest contrast. Too few or too large of sub-regions may provide insufficient spatial data for detecting an angular discrepancy. In one example, a range of size for sub-regions may include a lower threshold of 500×500 pixels and an upper threshold of 3000×3000 pixels. Generally, larger and/or fewer sub-regions are more statistically stable, however detection of the peak Brenner value may be more difficult and tilting direction sensitivity may be reduced. Smaller or more sub-regions increase sensitivity to detecting tilt, however increased signal noise may be a trade-off.

In one example, depending on the size of a FOV, sub-regions may overlap with adjacent sub-regions. For example, subject 400 has a 2000×2000 pixel area FOV and sub-region size of 1000×1000 pixel area. To achieve the desired sub-region size, the sub-regions overlap with one or more adjacent sub-regions. For example, the first sub-region 404 overlaps the second sub-region 406 by approximately 500 by 1000 pixels. The first sub-region 404 also overlaps with the fourth sub-region 412 by approximately 500 by 1000 pixels. The second sub-region 406 overlaps the fourth sub-region 412 by approximately 500 by 500 pixels. In one example, the overlapping smooths the transition of the Brenner peak position from one region to the other and produces higher quality tilting information. However, overlapping sub-regions is optional and may be avoided in some examples. For example, with a larger subject FOV and similar sub-region size, such as 4000×4000 pixel area field of view and 1000×1000 pixel area sub-regions may not overlap. Balancing signal noise and statistical significance, as discussed above, may be prioritized over sub-region overlapping.

FIG. 5 and FIG. 6 show a first set 500 and a second set 600, respectively, of contrast distribution curves representing an entire FOV of a subject. As described above with respect to FIGS. 3-4, to obtain the first set 500 and the second set 600 of contrast distribution curves, the controller (e.g., controller 124 of FIG. 1) may calculate a focal position of highest contrast for each sub-region of a plurality of sub-regions of the FOV. For example, the controller may acquire a plurality of contrast samples, e.g., 11 images, 21 images, etc., at different focal distances and derive a focal distance of highest image contrast based on the images and a curve-fitting algorithm to model contrast distribution. The resulting set of contrast distribution curves of the subject may be used to estimate angular discrepancy in the optical alignment of the microscope assembly, or in other words, a degree of tilt between the sample plane and the focal plane. In each curve, a measurement of image contrast is on the y-axis in an arbitrary unit, e.g., Brenner gradient values. Relative Z coordinates, e.g., the focal distance, are on the x-axis in micron (μm). In the examples, the relative Z coordinates on the x-axis range from −10 μm to +10 μm.

Turning to the first set 500 shown in FIG. 5, the subject is divided into a left column 508, a center column 510, a right column 512, a top row 514, a middle row 516, and a bottom row 518, for nine sub-regions. For example, the first set 500 includes a first sub-region 502, a second sub-region 504, a third sub-region 506, and so on, for which contrast distribution curves are obtained. As described with respect to FIG. 4, the size and number of sub-regions may depend on factors including balancing noise intensity as an influence on detecting the location of the true $Z_0$. For example, a sub-region with a pixel count of 1000 by 1000 may be sufficient with a typical sensor array in the visible wavelength. A plurality of sub-regions with higher or lower pixel count may be preferred for other sensor array configurations, or other factors, such as the assay type.

In one example, the contrast distribution curves derived for the subject 500 include a first curve 502a representing the first sub-region 502, a second curve 504a representing the second sub-region 504, a third curve 506a representing the third sub-region 506, and so on. The contrast distribution curves, e.g., the first curve 502a, the second curve 504a, and the third curve 506a, representing the subject are arranged relative to a location in the FOV. For example, the first sub-region 502 may represent an upper left region of the FOV, the second sub-region 504 may represent an upper center region, and the third sub-region 506 may represent a lower left region of the FOV. In one example, the first curve 502a, the second curve 504a, and the third curve 506a may represent contrast distribution curves for the first sub-region 404, the fourth sub-region 412, and the third sub-region 408, respectively, of the subject 400 illustrated with respect to FIG. 4.

The entire FOV may be understood to have the best image quality at the same focal position if the contrast distribution curves peak at the same relative $Z_0$ value. As can be seen in the first set 500, the peaks occur at the same focal position that is the relative Z coordinate where $Z_0$=0. For example, $Z_0$=0 at a first peak 502b of the first curve 502a, at a second peak 504b of the second curve 504a, and a third peak 506b of the third curve 506a, and so on for each of the nine sub-regions. Therefore, the sample plane may be understood to be parallel with the focal plane of the optical system. Under such a condition, it is possible to produce a well-focused image across the entire field of view without adjusting the optical alignment. For example, not only the center region of the image will be well-focused but also the peripheral will be sharp. However, under conditions where the contrast distribution curves peak at $Z_0 \neq 0$ in some regions, an amount of angular discrepancy between the sample plane and the focal plane may be identified and corrections made to optical alignment for increasing focus across the entire field of view.

Turning to the second set 600 shown in FIG. 6, as described above with respect to FIG. 4, a subject is divided into sub-regions. Contrast distribution curves are obtained for each sub-region based on a measurement of contrast in sample images acquired across a range of focal positions such as described above with respect to FIGS. 2-4. In one example, the subject may be the subject 400 and the second set 600 of contrast distribution curves may correspond to the nine sub-regions described with respect to FIG. 4.

The second set 600 includes a left column 620, a center column 622, a right column 624, a top row 626, a middle row 628, and a bottom row 630 of contrast distribution curves. In the example, the second set 600 includes a first curve 602a representing a first sub-region 602, a second curve 604a representing a second sub-region 604, a third curve 606a representing a third sub-region 606, a fourth curve 608a representing a fourth sub-region 608, a fifth curve 610a representing a fifth sub-region 610, a sixth curve 612a representing a sixth sub-region 612, a seventh curve 614a representing a seventh sub-region 614, an eighth curve 616a representing an eighth sub-region 616, and a ninth curve 618a representing a ninth sub-region 618. The contrast distribution curves, e.g., first curve 602a, second curve 604a, third curve 606a, etc., representing the subject are arranged relative to a location in the FOV. For example, the first sub-region 602 may be the same or similar as the first sub-region 404 illustrated with respect to FIG. 4.

The second set 600 illustrates a condition where the contrast distribution curves peak at $Z_0 \neq 0$ in some regions and therefore amount of angular discrepancy between the sample plane and the focal plane may be identified. For example, the curves in the center column 622, e.g., the fourth curve 608a, the fifth curve 610a, and the sixth curve 612a, peak at the same relative Z coordinate, where $Z_0=0$ μm. For example, $Z_0=0$ at a fifth peak 610b of the fifth curve 610a. The first curve 602a, the second curve 604a, and the third curve 606a, e.g., corresponding to the left column 620, peak at the same relative Z coordinate, where $Z_0 \neq 0$. For example, $Z_0=-1$ μm at a first peak 602b of the first curve 602a. The seventh curve 614a, the eighth curve 616a, and the ninth curve 618a, corresponding to the right column 624, peak at the same relative Z coordinate, where $Z_0 \neq 0$. For example, $Z_0=+1$ μm at a ninth peak 618b of the ninth curve 618a. Using the center column 622 as a reference point, it can be inferred that the optical system renders the highest contrast on the left side of the field of view about 2 μm before the right side.

To obtain the images for calculating the contrast distribution curves, such as shown in FIG. 5 and FIG. 6, a "Z-stack" of images may be acquired. In one example, the Z-stack may be a set of images taken at different focusing positions across the in-focus position for a field of view. The in-focus position may be determined using an auto-focusing technique. For example, the in-focus position may be determined using the laser auto-focus system as described with respect to FIGS. 1-2. In another example, a figure of merit approach may be used, such as the Brenner gradient, as described with respect to FIG. 3. For each sub-region, the images from the Z-stack are analyzed using the Brenner gradient to measure the contrast in the acquired image. In one example, a Z-stack may be 11 images taken from $Z_0+5$ μm to $Z_0-5$ μm increasing by 1 μm between each image. An absolute difference of focus position between subsequent images, also called the step size, may be decreased for higher tilt precision. The number of images in the Z-stack and the step size may depend on the focusing stage and limits to the smallest step size that can be reliably achieved.

In another example, the Brenner gradient curve may be acquired on-the-fly, where the focusing stage or objective module is continuously moved across the in-focus position while the image is taken and the Brenner gradient calculated continuously. By scanning back and forth rapidly, the peak contrast positions for all sub-regions and the tilting information may be acquired in semi-real time. Additionally, it is possible to integrate a curve fitting algorithm, such as the LM algorithm described with respect to FIG. 3, in the process to reduce the number of Brenner gradient values that may be obtained for estimating the curve. Such integration may reduce processing time for tilt estimation and mitigation.

Figure 7:
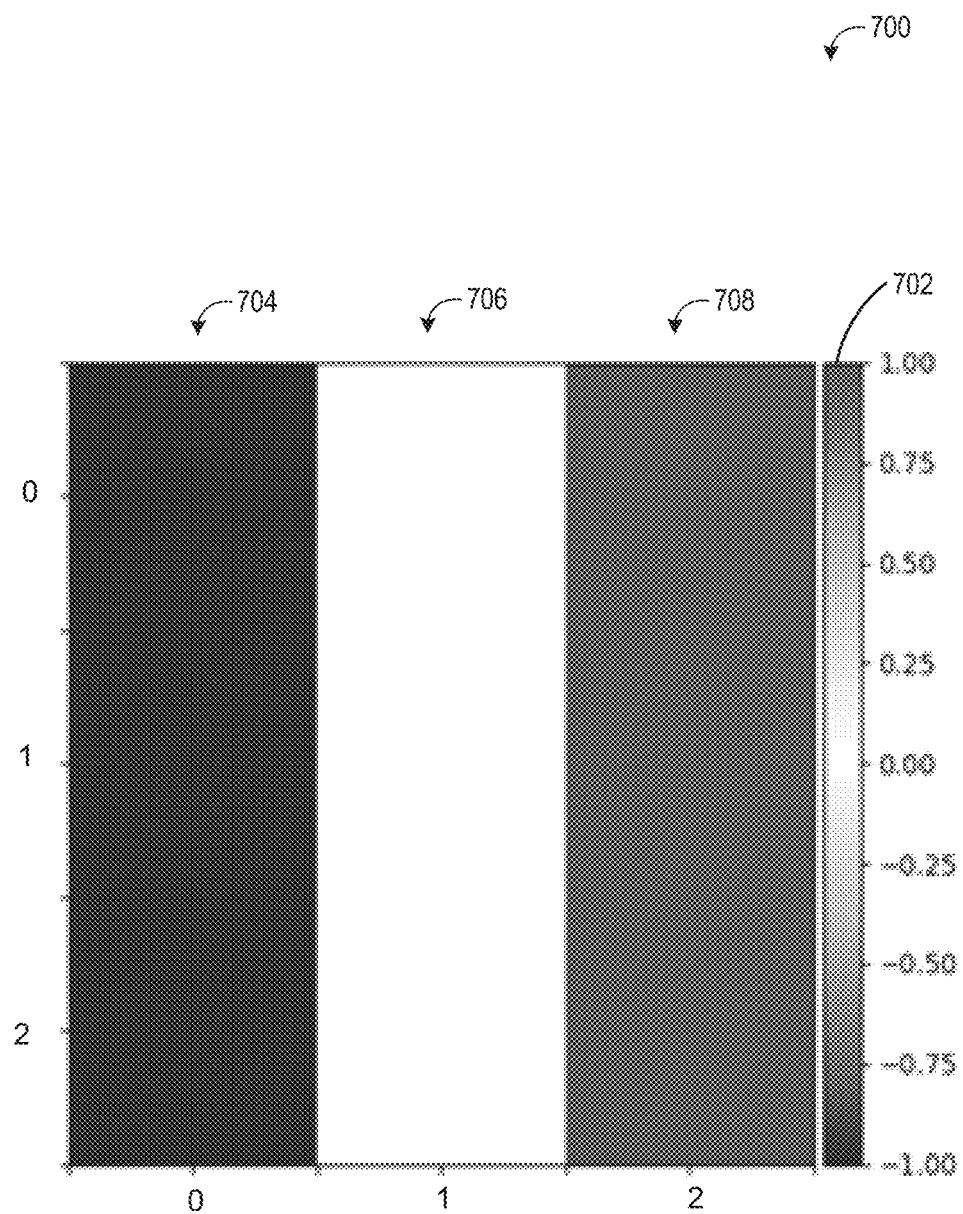
FIG. 7 shows an example tilting map representing an angular discrepancy between a sample plane and a focal plane for the second subject in FIG. 6.

FIG. 7 shows an example of a 2D intensity map 700. The 2D intensity map 700 illustrates the Z coordinate of best focus, where $Z=Z_0$, for each of the plurality of divided sub-regions against that of a central position. In one example, the 2D intensity map 700 may be derived from the second set 600 of contrast distribution curves illustrated with respect to FIG. 6. A key 702 shows an intensity scale where grey to white represents a range of +1 to 0 μm and white to black represents 0 μm to -1 μm. Ticked grid coordinates are indicated on the x-axis and y-axis. For the exemplary 3×3 grid, the x-axis and y-axis coordinates are 0, 1, and 2.

In the example, a left intensity region 704 may correspond to a left side of an FOV of an imaged sample, a center intensity region 706 may correspond to a center part of the FOV, and a right intensity region 708 may correspond a right side of the FOV. For example, the left intensity region 704 may correspond to the first column 402 of the subject 400 illustrated in FIG. 4 and represent the contrast distribution curves derived therefrom. Taken together, the left intensity region 704, the center intensity region 706, and the right intensity region 708 provide a visual indication or summary of the amount of angular discrepancy that is similarly conveyed by second set 600 of contrast distribution curves illustrated with respect to FIG. 6. The 2D intensity map 700 illustrates a +1 μm tilt on the right side, which indicates that the optical system renders the highest contrast on the left side of the image about 1 μm closer than the center of the image, and another 1 μm closer than the right side of the image.

Figure 8:
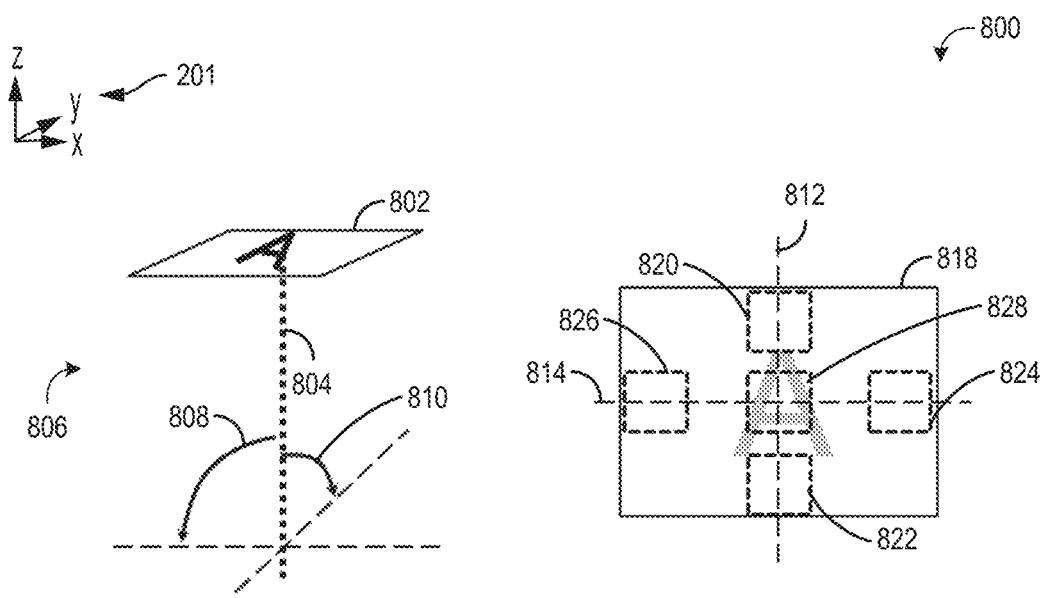
FIG. 8 shows a schematic diagram illustrating an approach for mitigating an angular discrepancy between a sample plane and a focal plane for a subject via the multi-detector quantitative microscopy system.
Figure 9:
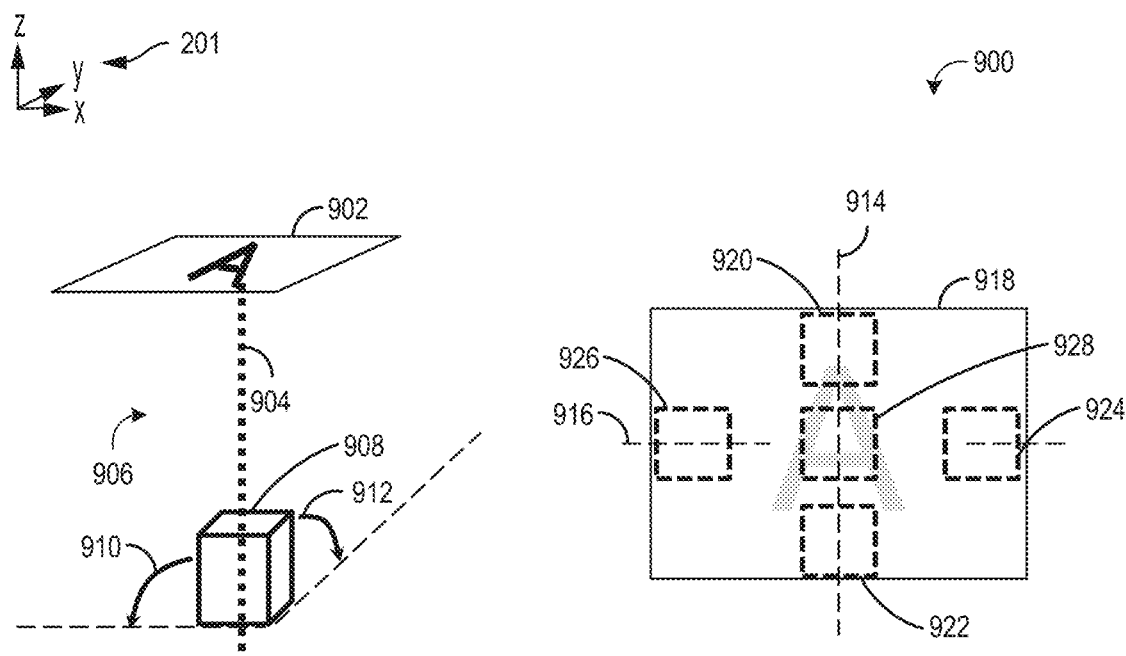
FIG. 9 shows a schematic diagram illustrating an additional approach for mitigating an angular discrepancy between a sample plane and a focal plane for a subject via the multi-detector quantitative microscopy system.

FIGS. 8-9 illustrate optical alignment approaches that may be executed by a controller of microscope assembly following detection of angular discrepancy between the sample plane and the focal plane (e.g., similar to, or the same as, the controller 124 of quantitative microscopy assembly 100). In one example, an amount of angular discrepancy may be detected according to the systems and methods described above with respect to FIGS. 1-7 and the method described below with reference to FIG. 10. In the examples shown, based on the amount of angular discrepancy detected by the controller, the controller may adjust the optical alignment of the microscope in various ways based on operation conditions and/or user preferences. The set of reference axes 201 is provided, indicating a y-axis, an x-axis, and a z-axis.

Once the tilting information is obtained, several approaches may be used for adjusting mechanisms of the microscope system to minimize image quality variation across the entire FOV. For example, the adjusting may include mechanically adjusting a tilting angle of one or a combination of a sample stage, an optical axis including an imaging sensor, or only the imaging sensor itself. A first approach to correct the angular discrepancy is to adjust the leveling of the sample holder. For example, a kinematic mount with fine-pitch adjusting screws may be use to achieve the leveling by adjusting the screws. In one example, Z-stack data in a batch fashion, e.g., a set of images taken across a range of focal positions including the in-focus or highest contrast position, can be used to provide the feedback between adjustments in an iterative fashion. In another example, on-the-fly data, e.g., rapid scanning to obtain peak contrast positions for all sub-regions and tilting information in semi-real time, can be used to provide the feedback between adjustments. The kinematic mount may be adjusted manually or by an electrical motor or actuator that is controlled with the feedback of the tilting information. However, in certain cases it may be desirable to adjust the optical axis of the imaging system instead of the sample plane. For example, a user may wish to avoid perturbing the sample. In such cases, the entire optical system may sit on an adjustable leveling mount so that the optical axis and hence the focal plane may be adjusted.

FIG. 8 shows a schematic diagram 800 illustrating a second approach for mitigating an angular discrepancy. The schematic diagram 800 includes a sample plane 802 and an optical axis 804 of an optical system 806, and two possible adjusting angles and corresponding adjusting planes of the optical system 806. In one example, the sample plane 802 may be a subject positioned in a sample plate (e.g., a subject in a well 221 of microplate 215 shown in FIG. 2). In one example, the optical system 806 may be an entire optical train of a microscope assembly included in a multi-detector system (e.g., the objective lens 208, the first optical passage 232, the second optical passage 246, the camera 238, etc. shown in FIG. 2). The optical axis 804 of the optical system may be parallel with the z-axis. The two possible adjusting angles include a first adjusting angle 808 and corresponding adjusting plane 812 and a second adjusting angle 810 and corresponding adjusting plane 814. The first adjusting angle 808 and the second adjusting angle 810 may be orthogonal angles. The optical axis 804 may be perpendicular to the sample plane 802 when no tilting is present. Otherwise, tilting error can be mitigated by adjusting a leveling mount of the optical system 806 based on one or both of the two adjusting angles corresponding to the two adjusting planes.

A FOV 818 for the subject shows a reduced set of sub-regions situated at north 820, south 822, east 824, west 826, and central 828 parts of the FOV. By following the tilting information provided by these five sub-regions, angular discrepancy can be mitigated. For example, using the 2D intensity map 700 described with respect to FIG. 7, an amount of tilt indicated for the west 826 part of the FOV 818 is +1 μm. The amount of tilt indicated for the north 820, central 828, and south 822 parts of the FOV 818 is 0 μm. The amount of tilt indicated for the east 824 part of the FOV 818 is −1 μm. The detected tilt illustrated in FIG. 7 may be mitigated by adjusting the corresponding angles by the amounts indicated. For example, the first adjusting angle of the leveling component of the optical system 806 may be decreased by +1 μm and increased by −1 μm from west to east.

In some cases, it may be undesirable or less effective to mechanically tilt the entire optical axis due to the size, weight, and the sensitivity of the optical system. Therefore, it may be beneficial to adjust the tilting angles of the imaging sensor, such as a camera (e.g., camera 238 in FIG. 2), using the Scheimpflug principle. The Scheimpflug principle describes an optical imaging condition, which allows imaging of an obliquely tilted object with the maximally possible depth of focus and minimal image distortion. In one example, the imaging sensor has a sensing plane that can be tilted. Preferentially, the sensing plane is parallel with the sample. However, tilt between the subject and the objective lens may be compensated for by introducing an angle at the camera, rather than adjusting the entire optical train. FIG. 9 shows a schematic diagram 900 illustrating such an approach, e.g., a third approach, for mitigating an angular discrepancy.

The schematic diagram 900 includes a sample plane 902 and an optical axis 904 of an optical system 906. In one example, the sample plane 902 may be a subject positioned in a sample plate (e.g., a subject in a well 221 of microplate 215 shown in FIG. 2). In one example, the optical system 906 may be an entire optical train of a microscope assembly included in a multi-detector system (e.g., the objective lens 208, the first optical passage 232, the second optical passage 246, the camera 238, etc. shown in FIG. 2). A camera 908 included in the optical system 906 may be mounted to the optical system via a tilting adapter. By controlling the tilting adapter, two orthogonal tilting angles, e.g., first adjusting angle 910 and second adjusting angle 912, may be introduced between the optical axis 904 and the sensor plane of the camera 908. The sensor plane may be the active sensing surface of the camera. In one example, the first adjusting angle 910 may correspond to a first adjusting plane 914 and the second adjusting angle 912 may correspond to a second adjusting plane 916 of a FOV 918.

Similarly as described above, by following the tilting information corresponding to a reduced set of sub-regions situated at north 920, south 922, east 924, west 926, and central 928 parts of an FOV 918, angular discrepancy can be mitigated. For example, using the 2D intensity map 700 described with respect to FIG. 7, the detected tilt may be mitigated by adjusting the corresponding angles by the amounts indicated. For example, the first adjusting angle 910 of the leveling adapter of the camera 908 may be adjusted to compensate for the +1 μm to −1 μm tilt from the west side to the east side of FOV. The dimension of the camera is usually much smaller and more robust than the entire optical system and hence is much easier to be manipulated without disturbing the optical system. Again, such adjustment can be achieved via either manually, e.g., by a user making an adjustment, or electrical means, e.g., via an actuator, as it is described above.

However, tilting the image sensor or may be less effective in terms of the amount of adjustment to achieve the same correction effect due to the typical magnification value of a microscopy system. For example, roughly ten times the tilting angle at the sensor plane would be required to achieve the same amount of correction at the sample plane with an optical magnification of ten. In addition, a small amount of geometric distortion may be introduced in the resulting image. Fortunately, such perspective distortion can be easily removed with minimum impact to the final image quality, especially the tilting amount is small which is common in the microscopy application. The perspective distortion may be removed by following the common practice in the camera calibration procedure. Additional computation expense would be the possible penalty of this approach.

The advantages of sensor-side of correction include an increase in the speed of image focusing/capture/correction, since a much smaller and lighter object is manipulated. When tilt correction at the sensor plane is implemented via electrical actuators and automatic correction algorithm, the focusing optimization may be implemented between sample-loading steps in an on-the-fly and less intrusive fashion, which may increase image focus and increase image quality even with the presence of possible user disturbance and higher tolerance to the flatness of sample holding substrate.

In addition, for the multi-detector microscopy system that has multiple imaging trains aiming at a common sample target, it is advantageous to allow each imaging train to be adjusted independently to achieve focusing optimization simultaneously. For example, the angular detection and mitigation strategies may be executed independently for each microscope assembly of the multi-detector system 200. As another advantage, the smaller form factor of the sensor-side mitigation approach eases up the physical size constraint of such a system with multiple image train.

Regardless of which mitigation scheme is selected, the correcting procedure may be executed in various frequency depending on the needs. For example, it may be desired to implement a mitigation scheme after shipping and installation of a microscopy system. Additionally or alternatively, angular discrepancy detection and mitigation may be introduced in a regular maintaining procedure. For most demanding applications, such correcting procedure may be executed whenever a new sample plate is loaded or before a large batch of image acquisition is about to be performed.

Figure 10:
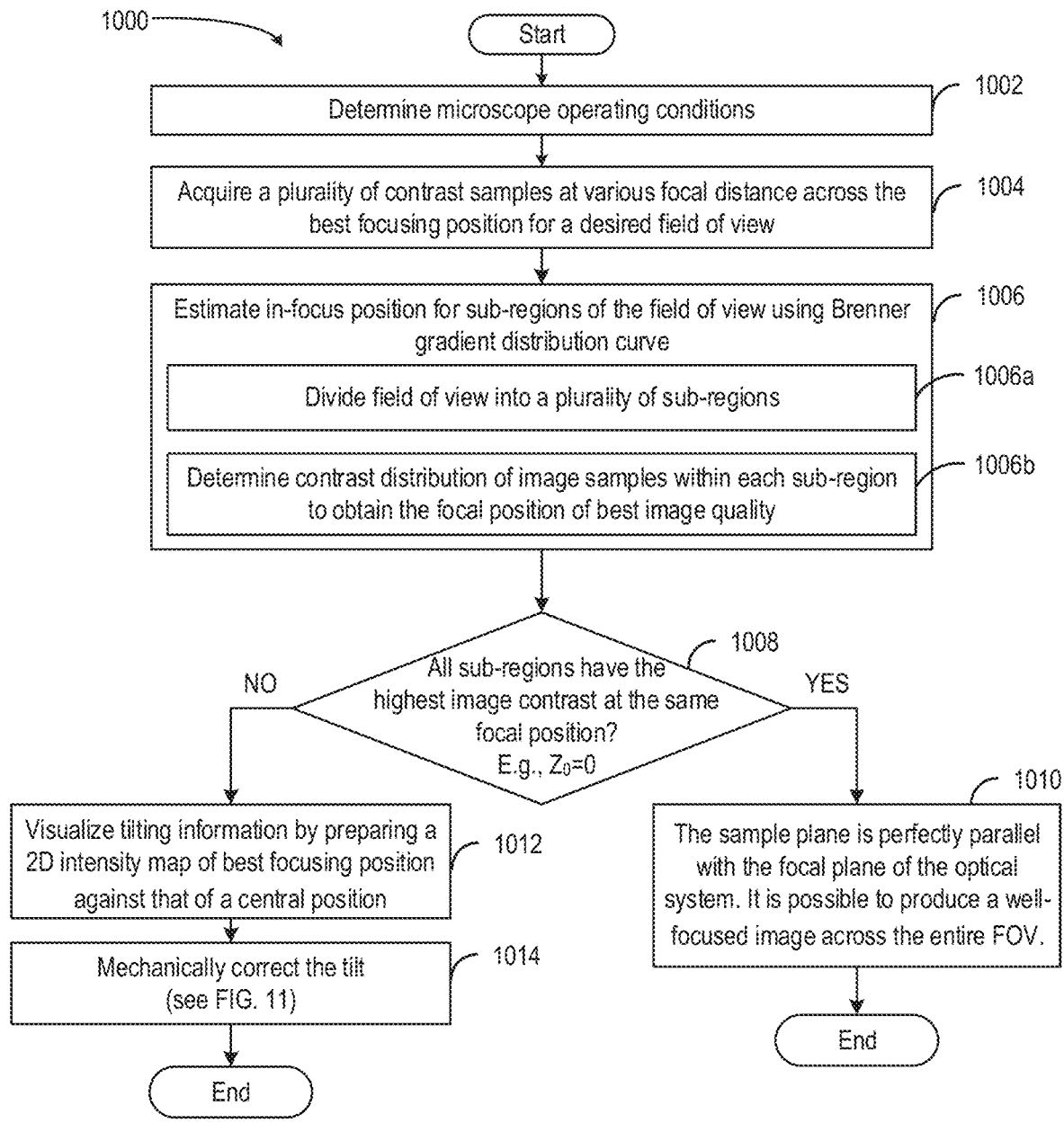
FIG. 10 shows a flow chart illustrating a method for detecting angular discrepancy between a sample plane and a focal plane for a subject via the multi-detector quantitative microscopy system.
Figure 11:
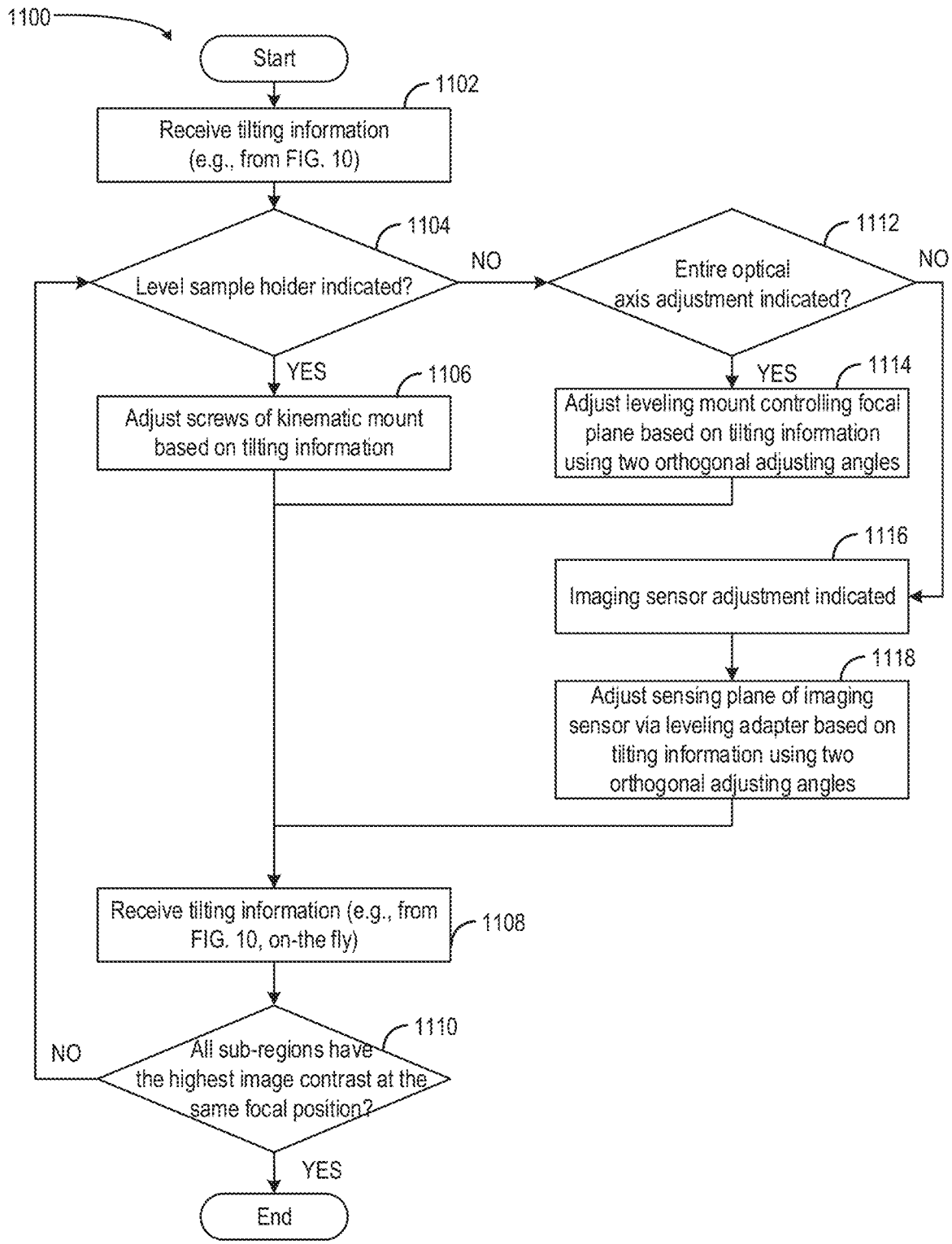
FIG. 11 shows a flow chart illustrating a method for mitigating angular discrepancy between a sample plane and a focal plane for a subject via the multi-detector quantitative microscopy system.

FIG. 10 and FIG. 11 show flowcharts illustrating a method 1000 and 1100, respectively, for detecting and mitigating angular discrepancy in a microscope system, or in other words, a degree of tilt between a sample plane and a focal plane. The microscope system may be similar to, or the same as, the quantitative microscopy assembly 100 described above with reference to FIG. 1. In another example, the microscope system may be similar to, or the same as, the multi-detector system 200 described above with reference to FIG. 2. Instructions for carrying out method 1000 and the rest of the methods included herein may be executed by a controller (e.g., controller 124 shown in FIG. 1 and described above) based on computer readable instructions stored on a memory of the controller and in conjunction with signals received from sensors of the system, such as the sensors described above with reference to FIG. 1. The controller may employ actuators of the system to adjust system operation, according to the methods described herein. As one example, the controller may adjust the position of a subject imaged by the microscope (e.g., a subject in microplate 215 shown in FIG. 2 and described above) relative to an objective lens of the microscope (e.g., objective lens 208 shown in FIG. 2 and described above) by increasing or decreasing a focal distance between the subject and the objective lens. Increasing or decreasing the focal distance between the subject and the objective lens may include adjusting a position of the objective lens relative to the subject (e.g., similar to, or the same as, by controlling the objective module 228 shown in FIG. 2 and described above). Additionally or alternatively, increasing or decreasing the focal distance between the subject and the objective lens may include adjusting a position of a stage supporting the subject relative to the objective lens. Adjusting the focal distance may include transmitting electronic signals to an actuator configured to control the focal distance, such as a motor (e.g., a motor component to the objective module 228). It should be understood that the position of the subject and the focal distance, as described herein, both refer to the distance between the subject and the objective lens.

Turning to FIG. 10, the method 1000 may include determining microscope operating conditions at 1002. In one example, determining operating conditions may include determining an initial position of the subject and objective lens (e.g., determining an initial distance between the subject and the objective lens), determining an ON/OFF condition and/or intensity of a light source of the microscope, receiving service history or use history, for example, stored in a log, etc. In one example, for a multi-detector microscope system, service history may include angular discrepancy detection and/or correction history for the one or more microscope assemblies. In another example, use history may be provided indicating whether the microscope assembly is the first, last, etc. microscope assembly of the multi-detector system for which tilt detection is desired. In one example, determining microscope operating conditions may include receiving an in-focus position for a field of view of a subject obtained by performing an auto-focusing routine. For example, the auto-focusing routine may be stored in a memory of the controller. In one example, the auto-focusing routine may rely on a LAF sensor assembly including a laser beam to rapidly focus the microscope assembly on a desired area of the sample, such as described with respect to FIG. 2. In another example, the auto-focusing routine may use a direct measurement method such as the Brenner gradient to measure contrast in an acquired image. A Brenner gradient distribution curve may be calculated to derive a focal distance of highest image contrast based on a set of sampled images and a curve-fitting algorithm to model contrast distribution.

At 1004, the method 1000 may include acquiring a plurality of image samples at various focal distance across the in-focus position for the FOV. For example, based on the in-focus position obtained by the auto-focusing routine described above, the method may include obtaining a Z-stack. In one example, the Z-stack may include 11 images from $Z_0+5$ μm to $Z_0-5$ μm with 1 μm step between images to form the stack. Acquiring the plurality of image samples may include imaging the subject via an image sensor of the microscope assembly (e.g., via a detector of the microscope, such as the detector 122, as described above with reference to FIG. 1, or camera 238, as described above with reference to FIG. 2).

At 1006, the method 1000 may include estimating an in-focus position for sub-regions of the FOV using the Brenner gradient distribution. This may include dividing the FOV into a plurality of sub-regions, such as described with reference to FIG. 4, and modeling a contrast distribution of image samples for each of the sub-regions, such as described with reference to FIGS. 3, 5-7.

At 1006a, the method 1000 may include dividing the FOV into a plurality of sub-regions, which may include determining a desired size (e.g., pixel area) and number of sub-regions. In one example, the size and number of sub-regions that the FOV is divided into may depend on factors including balancing signal and noise, and statistical significance. Generally, larger and/or fewer sub-regions are more statistically stable; however, detection of the peak Brenner value may be more difficult and tilting direction sensitivity may be reduced. Smaller and/or more sub-regions may increase sensitivity; however, increased signal noise may be a trade-off. In one example, a pixel area range for sub-regions may include a lower threshold of 500×500 pixels and an upper threshold of 3000×3000 pixels. In one example, sub-regions may or may not overlap with adjacent sub-regions.

At 1006b, the method 1000 may include modeling the contrast distribution of sample images within each sub-region to obtain the focal position of best image quality, or in other words, the focal position of highest contrast. A contrast distribution may be obtained by calculating the Brenner gradient for each sample image (e.g., of a Z-stack), as described above, where the Brenner gradient is defined as:

$$B_{zy} = \frac{\sum_{x,y}(I(x, y+2) - I(x, y))^2}{\sum_{x,y}I(x, y)^2}, B_{zx} = \frac{\sum_{x,y}(I(x+2, y) - I(x, y))^2}{\sum_{x,y}I(x, y)^2},$$

$$B_z = \sqrt{B_{zy}^2 + B_{zx}^2},$$

where I is the image intensity at pixel (x, y) acquired at a subject distance of Z (where the subject distance is a distance between the subject and the objective lens). The Brenner gradient calculated for the plurality of sample images may be integrated with a curve fitting algorithm, such as the Levenberg-Marquardt (LM) algorithm, to model the data with a corresponding Lorentzian function and to estimate the location of Brenner peak or the in-focus position in the sub-region.

At 1008, the method 1000 may include evaluating whether the sub-regions have the highest image contrast at the same focal position. In one example, a user may obtain a set of the Brenner gradient distribution curves representing each sub-region of the FOV, such as shown with respect to FIGS. 5-6. In another example, the Brenner peaks and corresponding sub-regions may be provided in a 2D array representing the FOV. In one example, the focal position may be the relative Z coordinate where $Z_0=0$ for samples having the same focal position of best image quality (e.g., the Brenner peak). In one example, all sub-regions may be understood to have the highest image contrast at the same position based on an absolute in-focus position being less than a threshold absolute in-focus position. For example, the absolute in-focus position may be defined by an absolute difference between the relative Z coordinate where $Z_0=0$ and the in-focus position of the sub-region. The threshold absolute in-focus position may be a calibrated, non-zero amount of angular discrepancy. If all sub-regions do not have the highest image contrast at the same position, the method continues to 1012. If all sub-regions have the highest image contrast at the same position, the method continues to 1010.

At 1010, the method 1000 may include determining the sample plane is parallel with the focal plane of the optical system. It is possible to produce a well-focused image across the entire FOV. In one example, the method may include acquiring one or more images of the subject.

At 1012, the method 1000 may include visualizing the tilting or angular discrepancy information, such as described with respect to FIG. 7. For example, as above, the focal position of highest image contrast and corresponding sub-region representing each sub-region of the FOV may be stored in a 2D array. The 2D array may be visualized as a 2D intensity map, similar to a topographical map. The resulting map indicates the Z coordinate of best focus, where $Z=Z_0$, for each of the sub-regions against that of a central position such as the center sub-region of the divided FOV (e.g., fifth sub-region 610 or center column 622 in FIG. 6). For example, $Z_0$ for a center sub-region may be $Z_0=315$ μm (e.g., read from the mechanical stage encoder), the left column may have $Z_0=316$ μm, and the right column may have $Z_0=314$ μm. The resulting 2D intensity map may include the Z readings relativized or offset so that the Z coordinate of best focus for the center sub-region has $Z_0=0$ μm. Thus, following the example, the left column relative to the center sub-region may have $Z_0=1$ μm and the right column may have $Z_0=-1$ μm. In one example, the 2D intensity map may reveal a simple tilted plane, which may then be used to increase focus across the entire field of view.

At 1014, the method 1000 may include mechanically correcting the tilt. Various approaches may be used to mechanically correct the tilt. For example, the method may include continuing to a sub-method for mitigating detected angular discrepancy, such as described in the method 1100 below and described above with reference to FIGS. 8-9. For example, the sample stage may be adjusted to correct the tilting. In another example, the optical axis of the optical system including the detector or camera may be tilted. In another example, the detector itself may be tilted to compensate the tilting.

Turning to FIG. 11, the method 1100 may include receiving tilting information at 1102. In one example, the tilting information may be obtained by performing angular discrepancy detection, such as described above and with reference to the method 1000 shown in FIG. 10. For example, tilting information may include a 2D array of the peak contrast position for the divided sub-regions of an FOV of a subject.

At 1104, the method 1100 may include determining whether leveling a sample holder is indicated. For example, the sample holder including a kinematic mount with fine-pitch adjusting screws may be used to achieve the leveling by adjusting the screws. Such an approach may be preferred for simplicity. If leveling the sample holder is indicated, the method may continue to 1106. If leveling the sample holder is not indicated, the method may continue to 1112. In some cases it may be desirable to adjust the focal plane of the imaging system instead of the sample plane. For example, a user may wish to avoid perturbing the sample. In another example, the sample holder may not be configured for leveling or simple adjustment.

At 1106, the method 1100 may include adjusting the screws of the kinematic mount based on the tilting information. For example, a 2 μm tilt in a north to south direction may be mitigated by adjusting the screws so that the sample holding plate may be tilted accordingly to compensate. For example, the sample holding plate may sit on tips of the adjusting screws. When the screws are raised or lowered, the sample holding plate is tilted. In one example, the kinematic mount may be adjusted via an electrical motor or actuator that is controlled with the feedback of the tilting information.

At 1108, the method 1100 may include receiving tilting information. For example, Z-stack data may be received in a batch fashion to provide the feedback between adjustments in an iterative fashion. In one example, the method 1100 may return to the method 1000. For example, the method may include deriving a second set of contrast distribution curves for a second set of contrast samples obtained after tilt correction. In another example, on-the-fly data, e.g., rapid scanning to obtain peak contrast positions for all sub-regions and tilting information in semi-real time, can be used to provide the feedback between adjustments.

At 1110, the method 1100 may include determining whether all sub-regions have the highest image contrast at the same focal position. In one example, all sub-regions may be understood to have the highest image contrast at the same focal position based on an absolute in-focus position being less than a threshold absolute in-focus position. For example, the absolute in-focus position may be defined by an absolute difference between the relative Z coordinate where $Z_0=0$ and the in-focus position of the central sub-region. The threshold absolute in-focus position may be a calibrated, non-zero amount of angular discrepancy. If all sub-regions do not have the highest image contrast at the same position, the method may return to 1104. If all sub-regions have the highest image contrast at the same position, the method may end.

At 1112, the method 1100 may include determining whether adjusting an entire optical axis is indicated. For example, the entire optical system may sit on an adjustable leveling mount so that the optical axis and hence the focal plane may be adjusted. If adjusting the entire optical axis is indicated, the method may continue to 1114. If adjusting the entire optical axis is not indicated, the method may continue to 1116. For example, it may be undesirable or less effective to mechanically tilt the entire optical axis due to the size, weight, and the sensitivity of the optical system. Therefore, it may be beneficial to only adjust the tilting angles of the imaging sensor or detector, such as camera (e.g., camera 238 in FIG. 2, detector 122 in FIG. 1).

At 1114, the method 1100 may include adjusting the leveling mount controlling the focal plane of the optical system based on received tilting information using two orthogonal adjusting angles. For example, the entire optical system may be adjusted by adjusting a first adjusting angle corresponding to a first adjusting plane and a second adjusting angle corresponding to a second adjusting plane of the optical system, such as described above with reference to FIG. 8. Together, the two orthogonal adjusting angles represent north-south tilt control and east-west tilt control that account for possible tilt conditions. In one example, using the 2D intensity map 700 described with respect to FIG. 7, an amount of tilt indicated for a west part of the FOV may be +1 µm. The amount of tilt indicated for the north, central, and south parts of the FOV may be 0 µm. The amount of tilt indicated for the east part of the FOV may be −1 µm. The detected tilt illustrated in the 2D intensity map 700 may be mitigated by adjusting the corresponding angles by the amounts indicated. For example, the first adjusting angle of the leveling component of the optical system may be decreased by +1 µm and increased by −1 µm from west to east. In one example, the leveling mount may be adjusted via an electrical motor or actuator that is controlled with the feedback of the tilting information.

At 1108, the method 1100 may include receiving tilting information as described previously. For example, Z-stack data may be received in a batch fashion to provide the feedback between adjustments or feedback may be provided on-the-fly to obtain peak contrast positions for all sub-regions and tilting information in semi-real time.

At 1110, the method 1100 may include determining whether all sub-regions have the highest image contrast at the same focal position as described previously. For example, the method may determine whether the absolute in-focus position is less than the threshold absolute in-focus position for all sub-regions of the FOV. If all sub-regions do not have the highest image contrast at the same position, the method may return to 1104. If all sub-regions have the highest image contrast at the same position, the method ends.

At 1116, the method 1100 may determine that adjusting the imaging sensor is indicated. In one example, the imaging sensor is mounted to the optical system via a leveling adapter that may be tilted to compensate for tilting between the sample plane and focal plane.

At 1118, the method 1100 may include adjusting a sensing plane of the imaging sensor via the leveling adapter based on received tilting information using two orthogonal adjusting angles. By adjusting a tilting angle of the leveling adapter, two orthogonal tilting angles may be introduced between the optical axis and the sensing plane of the imaging sensor. The two orthogonal adjusting angles include a first adjusting angle corresponding to a first adjusting plane and a second adjusting angle corresponding to a second adjusting plane of the optical system, such as described above with reference to FIG. 9. Together, the two orthogonal adjusting angles represent north-south tilt and east-west tilt that account for possible tilt conditions. In one example, using the 2D intensity map 700 described with respect to FIG. 7, an amount of tilt indicated for a west part of the FOV may be +1 µm. The amount of tilt indicated for the north, central, and south parts of the FOV may be 0 µm. The amount of tilt indicated for the east part of the FOV may be −1 µm. The detected tilt illustrated in the 2D intensity map 700 may be mitigated by adjusting the corresponding angles by the amounts indicated. For example, the first adjusting angle of the leveling component of the optical system may be decreased by +1 µm and increased by −1 µm from west to east. In one example, the leveling adapter may be adjusted via an electrical motor or actuator that is controlled with the feedback of the tilting information.

At 1108, the method 1100 may include receiving tilting information as described previously. For example, Z-stack data may be received in a batch fashion to provide the feedback between adjustments or feedback may be provided on-the-fly to obtain peak contrast positions for all sub-regions and tilting information in semi-real time.

At 1110, the method 1100 may include determining whether all sub-regions have the highest image contrast at the same focal position as described previously. For example, the method may determine whether the absolute in-focus position is less than the threshold absolute in-focus position for all sub-regions of the FOV. If all sub-regions do not have the highest image contrast at the same position, the method may return to 1104. If all sub-regions have the highest image contrast at the same position, the method may end.

In examples where a microscope assembly is included in a multi-detector system, such as described above, the method 1000 and the method 1100 may be repeated for each microscope assembly of the system until angular discrepancy has been detected and mitigated for all. For example, angular discrepancy detection and mitigation may be performed iteratively until a non-zero threshold amount of angular discrepancy is surpassed for each microscope assembly of the system. In another example, the method 1000 may be performed for all microscope assemblies of the multi-detector system and, following, the method 1100 may be performed for any of the microscope assemblies that do not surpass the threshold amount of angular discrepancy, including iterative correction and tilt detection.

In this way, by configuring the microscope assembly as described above and controlling the microscope assembly as described above, the microscope assembly may increase focus across an entire field of view to capture more quickly and accurately high-resolution details and wide-area capability. By detecting and mitigating angular discrepancy between the focal plane and sample plane, image quality degradation associated with tilting may be reduced and an efficiency of the auto-focusing may be increased, which may increase productivity. In some examples, the disclosed approaches may be adapted to modeling contrast distribution with fewer sample images and semi-real time tilt estimation for increased efficiency. In some examples, the disclosed approaches may be performed independently for each optical axis of a multi-detector microscope system, for even higher throughput. Further, the strategies disclosed may be executed in various frequency depending on user preferences. For example, for some use cases, angular discrepancy detection may be performed after microscope shipping and installation. In other use cases, angular discrepancy detection may be performed more frequency, such as part of a regular maintenance strategy, or between sample plates, for particularly demanding applications.

The disclosure also provides support for a method for image-based detection of optical alignment for a microscope system, comprising: acquiring a plurality of contrast samples of a field of view of a subject, determining a contrast distribution for a plurality of divided sub-regions for the field of view based on the plurality of contrast samples, and, generating an amount of angular discrepancy based on an in-focus position derived from the contrast distribution for each of the plurality of divided sub-regions. In a first example of the method, the method further comprises: adjusting mechanisms of the microscope system based on the amount of angular discrepancy to minimize image quality variation across an entire field of view. In a second example of the method, optionally including the first example, the adjusting includes mechanically adjusting a tilting angle of one or a combination of a sample stage, an optical axis including an imaging sensor, or only the imaging sensor itself. In a third example of the method, optionally including one or both of the first and second examples, the plurality of contrast samples include a plurality of image samples acquired at various focal distance across the in-focus position for a central part of the field of view. In a fourth example of the method, optionally including one or more or each of the first through third examples, the in-focus position for the field of view is determined using an auto-focus system, the auto-focus system including an auto-focus controller having computer readable instructions for executing an auto-focusing routine for adjusting the position of an objective relative to the subject. In a fifth example of the method, optionally including one or more or each of the first through fourth examples, the subject is positioned in a microplate resting on a stage, the stage being positioned above a plurality of objective lenses, and a detector is coupled to each objective lens of the plurality of objective lenses. In a sixth example of the method, optionally including one or more or each of the first through fifth examples, the method further comprises: generating the amount of angular discrepancy for each detector coupled to each objective lens of the plurality of objective lenses. In a seventh example of the method, optionally including one or more or each of the first through sixth examples, the determining includes using a curve-fitting algorithm with a corresponding Lorentzian function to estimate the in-focus position. In an eighth example of the method, optionally including one or more or each of the first through seventh examples, the method further comprises: determining an entire field of view is in-focus in response to the in-focus position of each sub-region being less than a threshold absolute in-focus position.

The disclosure also provides support for a multi-detector microscope system, comprising: a set of microscope assemblies arranged in an x-configuration, each of the set of microscope assemblies including: an objective lens and a stage configured to support a subject to be imaged, a controller with computer readable instructions stored on non-transitory memory that when executed, cause the controller to: for each of the set of microscope assemblies: acquire a plurality of contrast samples of the subject, determine a contrast distribution for a plurality of divided sub-regions for a field of view based on the plurality of contrast samples, and, generate an amount of angular discrepancy based on an in-focus position derived from the contrast distribution for each of the plurality of divided sub-regions. In a first example of the system, the subject is positioned in a well of a microplate resting on the stage, the stage being positioned above the set of microscope assemblies. In a second example of the system, optionally including the first example, the plurality of contrast samples are acquired by a camera coupled to the objective lens. In a third example of the system, optionally including one or both of the first and second examples, the plurality of contrast samples are acquired at various focal distance across the in-focus position for a central part of the field of view. In a fourth example of the system, optionally including one or more or each of the first through third examples, the in-focus position for the central part of the field of view is determined using an auto-focus system, the auto-focus system including an auto-focus controller having computer readable instructions for executing an auto-focusing routine for adjusting the position of the objective lens relative to the subject. In a fifth example of the system, optionally including one or more or each of the first through fourth examples the computer readable instructions further comprising for each of the set of microscope assemblies: mechanically adjust one of the stage, an optical axis including a camera, and the camera based on the amount of angular discrepancy.

The disclosure also provides support for a method for a multi-detector quantitative microscopy system, comprising: detecting with an objective lens coupled to a camera an amount of angular discrepancy between a focal plane of the objective lens and a sample plane of a subject by obtaining an in-focus position for each of a plurality of divided sub-regions of a field of view of the subject, the obtaining based on a contrast distribution of a plurality of contrast samples acquired by the camera, wherein the subject is positioned in a well of a microplate, the microplate resting on a stage positioned above the objective lens. In a first example of the method, the method further comprises: mechanically adjusting one of the stage, an optical axis including the camera, and the camera based on the amount of angular discrepancy. In a second example of the method, optionally including the first example, the plurality of contrast samples are acquired at various focal distance across the in-focus position for a central part of the field of view. In a third example of the method, optionally including one or both of the first and second examples, the in-focus position for each of the plurality of divided sub-regions is calculated by scanning across the in-focus position for a central part of the field of view while simultaneously modeling the contrast distribution of each sub-region and the amount of angular discrepancy is inferred in semi-real time. In a fourth example of the method, optionally including one or more or each of the first through third examples, the amount of angular discrepancy is visualized in a 2D intensity map of the in-focus position for each sub-region relative to a central position.

Note that the example control and estimation routines included herein can be used with various system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to other microscope types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for image-based detection of optical alignment for a microscope system, comprising:
   acquiring, with the microscope system, a plurality of contrast samples of a field of view of a subject, wherein each of the plurality of contrast samples is acquired at a different focal distance;
   determining a respective contrast distribution for each of a plurality of divided sub-regions for the field of view based on the plurality of contrast samples, a number of the plurality of divided sub-regions and an arrangement of the plurality of divided sub-regions relative to each other being selected to balance signal and noise ratio and statistical significance;
   determining a plurality of in-focus positions, each respective in-focus position of the plurality of in-focus positions derived from a respective contrast distribution such that a respective in-focus position is determined for each sub-region of the plurality of divided sub-regions; and
   generating an amount of angular discrepancy based on the plurality of in-focus positions, wherein the angular discrepancy is between a focal plane of an objective lens of the microscope system and a sample plane of the subject.

2. The method of claim 1, further comprising adjusting one or more mechanisms of the microscope system based on the amount of angular discrepancy to minimize image quality variation across an entire field of view, wherein the adjusting includes mechanically adjusting a tilting angle of one or a combination of a sample stage, an optical axis including an imaging sensor, or only the imaging sensor itself.

3. The method of claim 1, wherein the plurality of contrast samples include a plurality of image samples acquired at different focal distances across an in-focus position for a central part of the field of view, and wherein the in-focus position for the central part of the field of view is determined using an auto-focus system, the auto-focus system including an auto-focus controller having computer readable instructions for executing an auto-focusing routine for adjusting the position of the objective lens relative to the subject.

4. The method of claim 1, wherein the amount of angular discrepancy is a first amount of angular discrepancy, wherein the subject is positioned in a microplate resting on a stage, the stage being positioned above a plurality of objective lenses including the objective lens, and a respective detector is coupled to each objective lens of the plurality of objective lenses, and wherein a respective amount of angular discrepancy is generated for each detector coupled to each objective lens of the plurality of objective lenses.

5. The method of claim 1, wherein the determining each in-focus position includes using a curve-fitting algorithm with a corresponding Lorentzian function to estimate the in-focus position and determining that the amount of angular discrepancy corresponds to an entire field of view being in-focus in response to the in-focus position of each sub-region being less than a threshold absolute in-focus position.

6. A multi-detector microscope system, comprising:
   a set of microscope assemblies arranged in an x-configuration, each of the set of microscope assemblies including an objective lens and a detector;
   a stage configured to support a subject to be imaged; and
   a controller with computer readable instructions stored on non-transitory memory that when executed, cause the controller to:
   for each of the set of microscope assemblies:
      acquire a plurality of contrast samples of a field of view of the subject with the detector, wherein each of the plurality of contrast samples is acquired at a different focal distance;
      determine a respective contrast distribution for each sub-region of a plurality of divided sub-regions of the field of view based on the plurality of contrast samples, a number of the plurality of divided sub-regions and an arrangement of the plurality of divided sub-regions relative to each other being selected to balance signal and noise ratio and statistical significance;
      determine a plurality of in-focus positions, each respective in-focus position derived from a respective contrast distribution such that a respective in-focus position is determined for each sub-region of the plurality of divided sub-regions; and
      generate an amount of angular discrepancy based on the plurality of in-focus positions, wherein the angular discrepancy is between a focal plane of the objective lens and a sample plane of the subject.

7. The multi-detector microscope system of claim 6, wherein the subject is positioned in a well of a microplate resting on the stage, the stage being positioned above the set of microscope assemblies.

8. The multi-detector microscope system of claim 6, wherein the plurality of contrast samples is acquired at the different focal distances across an in-focus position for a central part of the field of view.

9. The multi-detector microscope system of claim 8, wherein the in-focus position for the central part of the field of view is determined using an auto-focus system, the auto-focus system including an auto-focus controller having computer readable instructions for executing an auto-focusing routine for adjusting the position of the objective lens relative to the subject.

10. The multi-detector microscope system of claim 6, the computer readable instructions further executable to, for each of the set of microscope assemblies: mechanically adjust one of the stage, an optical axis including the detector, and the detector based on the amount of angular discrepancy.

11. A method for a multi-detector quantitative microscopy system, comprising:

detecting, with an objective lens coupled to a camera, an amount of angular discrepancy between a focal plane of the objective lens and a sample plane of a subject by obtaining an in-focus position for each of a plurality of divided sub-regions of a field of view of the subject, the obtaining based on a respective contrast distribution for each sub-region of the plurality of divided sub-regions, each respective contrast distribution determined from a plurality of contrast samples of the subject acquired by the camera, wherein the subject is positioned in a well of a microplate, the microplate resting on a stage positioned above the objective lens, and wherein a size of each of the plurality of divided sub-regions of the field of view of the subject and the arrangement of the plurality of divided sub-regions of the field of view of the subject relative to each other are selected to increase a quality of the contrast distribution.

12. The method of claim 11, further comprising mechanically adjusting one of the stage, an optical axis including the camera, and the camera based on the amount of angular discrepancy.

13. The method of claim 11, wherein the plurality of contrast samples is acquired at various focal distances across an in-focus position for a central part of the field of view.

14. The method of claim 11, wherein the in-focus position for each of the plurality of divided sub-regions is calculated by scanning across an in-focus position for a central part of the field of view while simultaneously modeling the contrast distribution of each sub-region and the amount of angular discrepancy is inferred in semi-real time.

15. The method of claim 11, wherein the amount of angular discrepancy is visualized in a 2D intensity map of the in-focus position for each sub-region relative to a central position.

16. The method of claim 1, wherein each of the plurality of divided sub-regions is a same size.

17. The method of claim 1, wherein a size of at least one divided sub-region of the plurality of divided sub-regions is different than a size of other divided sub-regions of the plurality of divided sub-regions.

18. The method of claim 1, wherein the arrangement of the plurality of divided sub-regions relative to each other is arranged such that at least two adjacent divided sub-regions of the plurality of divided sub-regions overlap.

19. The method of claim 1, wherein the arrangement of the plurality of divided sub-regions relative to each other is arranged such that none of the plurality of divided sub-regions overlap.

* * * * *